(12) United States Patent
Werb et al.

(10) Patent No.: US 7,675,863 B2
(45) Date of Patent: Mar. 9, 2010

(54) METHOD AND APPARATUS FOR WIRELESS COMMUNICATION IN A MESH NETWORK USING CONNECTIVITY ASSESSMENT AT MULTIPLE FREQUENCIES

(75) Inventors: Jay Philip Werb, Newton, MA (US); Victor A. Berry, Ashburnham, MA (US); Howard P. Weiss, Newton, MA (US); C. Scott Lamb, Chelmsford, MA (US)

(73) Assignee: Sensicast Systems, Needham, MA (US)

( * ) Notice: Subject to any disclaimer, the term of this patent is extended or adjusted under 35 U.S.C. 154(b) by 23 days.

(21) Appl. No.: 11/776,876

(22) Filed: Jul. 12, 2007

(65) Prior Publication Data

US 2008/0036589 A1  Feb. 14, 2008

Related U.S. Application Data

(63) Continuation of application No. 10/836,103, filed on Apr. 30, 2004.

(60) Provisional application No. 60/488,491, filed on Jul. 17, 2003, provisional application No. 60/487,898, filed on Jul. 17, 2003, provisional application No. 60/539,243, filed on Jan. 26, 2004, provisional application No. 60/557,026, filed on Mar. 26, 2004.

(51) Int. Cl.
*G08B 1/08* (2006.01)

(52) U.S. Cl. .................. 370/241; 370/406; 370/310; 340/539.22

(58) Field of Classification Search .............. 370/351, 370/389, 241, 310, 406, 140
See application file for complete search history.

(56) References Cited

U.S. PATENT DOCUMENTS

| 6,590,928 B1 * | 7/2003 | Haartsen ................ 375/134 |
| 2003/0179742 A1 * | 9/2003 | Ogier et al. ............. 370/351 |

* cited by examiner

*Primary Examiner*—Charles N Appiah
*Assistant Examiner*—Michael T Vu

(57) ABSTRACT

A method and apparatus for communication in a wireless sensor network. In one embodiment, one or more routers in a network may be available for communication with one or more star nodes at a randomized time and/or frequency. A connectivity assessment, which may be performed at several different frequencies and/or times, may be performed to evaluate the quality of communications between devices in the network. Primary and secondary communication relationships may be formed between devices to provide for system redundancy. One or more proxies may be maintained where each proxy includes a status of one or more devices in the network, e.g., one or more star nodes or routers. Proxies may be used to handle information requests and/or status change requests, e.g., a proxy may be requested to change a communication relationship between devices in the network and may generate command signals to cause the corresponding devices to make the change.

14 Claims, 18 Drawing Sheets

METHOD AND APPARATUS FOR WIRELESS COMMUNICATION IN A MESH NETWORK USING CONNECTIVITY ASSESSMENT AT MULTIPLE FREQUENCIES

This application claims the benefit of U.S. provisional application 60/557,026, filed Mar. 26, 2004, U.S. provisional application 60/487,898, filed Jul. 17, 2003, and U.S. provisional application 60/448,491, filed Jul. 17, 2003. This application is a continuation of U.S. application Ser. No. 10/836,103, filed Apr. 30, 2004. U.S. applications 60/557,026; 60/487,898; 60/448,491 and 10/836,103 are hereby incorporated by reference in their entirety.

BACKGROUND OF INVENTION

1. Field of Invention

This invention relates to wireless communication networks in which wireless communication devices are active and send wireless information to each other and/or a host computer.

2. Description of Related Art

As advances in technology enable the development of ever-smaller sensors and actuators, capable of detecting events such as temperature change, movement, and touch, there has been increasing interest in creating self-configuring wireless networks of these sensors and actuators, together with additional communication devices and software. Such networks, typically known as Wireless Sensor Networks (WSNs), have a variety of potential applications. For example, WSNs may be used to detect soil moisture levels in plant nurseries, resulting in the automated activation of fans (when the environment is too hot) or sprinklers (when soil is too dry). WSNs may be used to log unauthorized handling of sensitive or expensive items such as computer equipment or artwork, or to track vehicles in a large parking lot, or for a wide variety of other applications.

As WSNs emerge from the research laboratory and become commercially viable, a question arises: What might the topology and communications processes of such networks look like? Various aspects of the invention described below relate to the configuration and operation of such WSNs.

SUMMARY OF INVENTION

In one aspect of the invention, a wireless sensor network includes a plurality of Star nodes constructed and arranged to transmit and receive wireless signals. At least one of the Star nodes is associated with at least one corresponding sensor device and is constructed and arranged to transmit a wireless signal including information from the corresponding sensor device. A plurality of Routers is each constructed and arranged to transmit and receive wireless signals for communication with at least one Star node and is constructed and arranged to transmit and receive wireless signals for communication with at least one other device in the network. Each of the plurality of Star nodes communicates with at least one Router using multiple frequencies. The Routers are each available for communication with at least one Star node for a period that begins at a randomized time or at a randomized frequency.

In one aspect of the invention, a wireless sensor network includes a plurality of Star nodes constructed and arranged to transmit and receive wireless signals. At least one of the Star nodes is associated with at least one corresponding sensor device and is constructed and arranged to transmit a wireless signal including information from the corresponding sensor device. A plurality of Routers is each constructed and arranged to transmit and receive wireless signals for communication with at least one Star node and is constructed and arranged to transmit and receive wireless signals for communication with at least one other device in the network. At least one Star node or at least one Router performs a connectivity assessment that indicates a measure of a quality of wireless communication between the at least one Star node or the at least one Router and at least one other device in the network. The connectivity assessment is used to determine a communication relationship between the at least one Star node or at least one Router and the at least one other device.

In one aspect of the invention, a wireless sensor network includes a plurality of Star nodes constructed and arranged to transmit and receive wireless signals. At least one of the Star nodes is associated with at least one corresponding sensor device and is constructed and arranged to transmit a wireless signal including information from the corresponding sensor device. A plurality of Routers is each constructed and arranged to transmit and receive wireless signals for communication with at least one Star node and is constructed and arranged to transmit and receive wireless signals for communication with at least one other device in the network. A Host computer communicates with the plurality of Routers at least in part via wireless signals. The Host computer includes a set of software proxies that include status information consistent with the current status of the plurality of Star nodes and the plurality of Routers.

Aspects of the invention also relate to a method for communication in a wireless sensor network. In one embodiment, one or more routers in a network may be available for communication with one or more star nodes at a randomized time and/or a randomized frequency. In another embodiment, a connectivity assessment may be performed to evaluate the quality of communications between one or more star nodes, or one or more routers, in the network, and at least one other device in the network. Based on the connectivity assessment, communication relationships may be formed. The connectivity assessment may be performed at several different frequencies and/or at different times. Primary and secondary communication relationships may be formed between devices in the network to provide for system redundancy. In another embodiment, one or more proxies may be maintained for a wireless sensor network where each proxy includes or represents a status of one or more devices in the network, e.g., one or more star nodes or routers. Proxies may be used to handle information requests and/or status change requests for the network, e.g., a proxy may be requested to change a communication relationship between devices in the network and may generate command signals to cause the corresponding devices to make the corresponding change.

These and other aspects of the invention will be obvious and/or apparent from the following description. Various aspects of the invention may be used alone or in any suitable combination.

BRIEF DESCRIPTION OF THE DRAWINGS

Aspects of the invention are described below with reference to the following drawings in which like numerals reference like elements, and wherein.

DETAILED DESCRIPTION

Aspects of the invention are described below with reference to illustrative embodiments. However, it should be understood that aspects of the invention are not limited to those embodiments described below, but instead may be used in any suitable system or arrangement. As used herein, "randomized" means a value or property that is determined based on a random or pseudorandom process. Also, use of the language "at least one of A or B" is intended to include/encompass A only, B only, and A and B.

Figure 1:
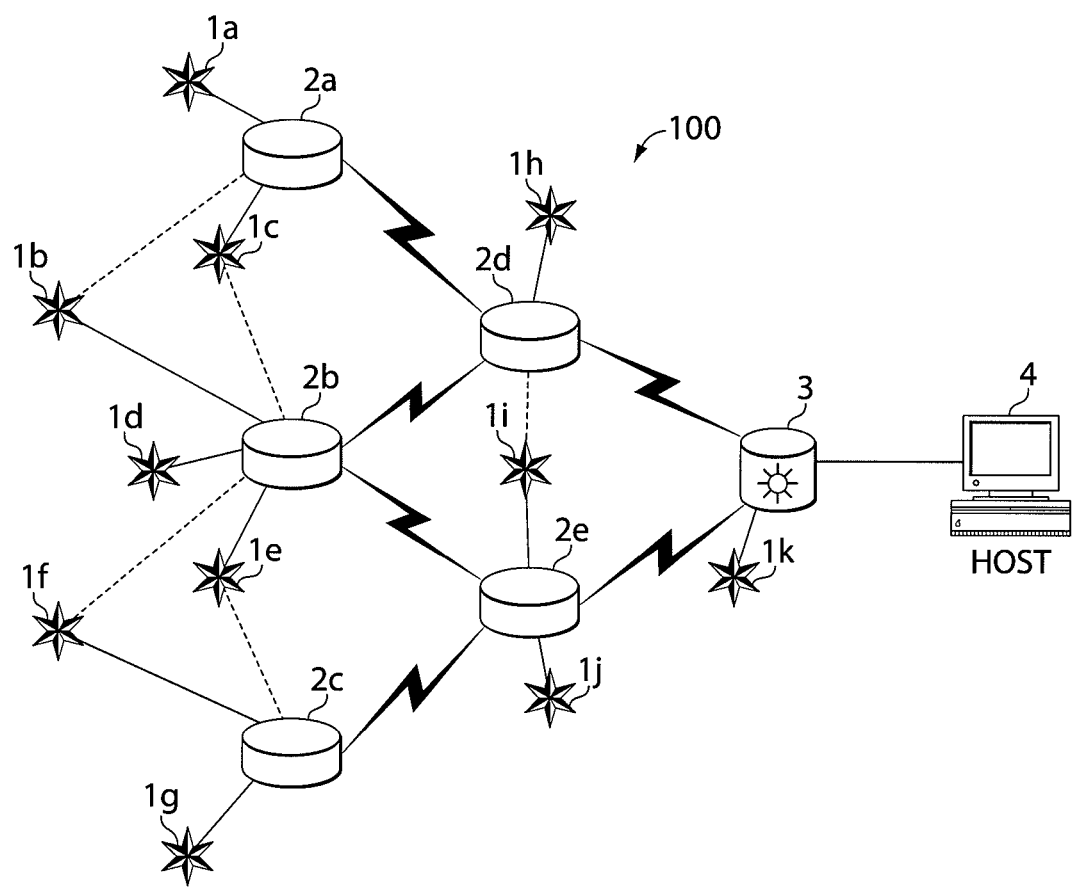
FIG. 1 shows an example of a Wireless Sensor Network (WSN) in accordance with the invention.

Aspects of the invention are described in relation to a WSN with a structure similar to that of a number of hub-and-spoke WLANs strung together into a mesh or hierarchical structure, as shown in the illustrative embodiment of FIG. 1.

The FIG. 1 system components may include:

Star nodes. Star nodes 1 may include small, battery-powered wireless radio transceivers that may provide low-bandwidth wireless connectivity for attached devices such as sensors (e.g., temperature, chemical, airflow) and actuators (e.g., fans, LEDs, switches). Star nodes 1 may be specialized to provide sensor connections for supporting specific applications. Examples may include security nodes for object touch detection, and environmental nodes for reporting temperature and humidity.

Routers. Routers 2 may be specialized nodes that self-organize into a WSN backbone. Routers 2 repeat or route the data transmitted on the WSN 100. They may transmit or relay messages to another node on the network, including Star nodes 1, Routers 2, or Gateways 3. They may also be configured to support various sensor connections. Routers 2 may also have parents; a Router's parent may be either another Router 2 or a Gateway 3.

Gateways. Gateways 3 or Bridges may be mechanically similar to Routers 2, except that, in place of re-transmitting messages, they may provide an interface to a different physical or logical network. Bridges are similar to Gateways 3. Bridges share a common network layer with connected devices (such as Star nodes 1 and Routers 2) and may translate communications for a different medium while preserving a network protocol. Gateways 3 may serve as portals to different types of networks, terminating the WSN protocol and translating communications to a different protocol appropriate for the new network. As used herein, the term "Gateway" refers to a single device that acts as a clearinghouse for WSN control functions, with the understanding that some of these functions may actually be implemented in a distributed fashion across a set of Gateways 3 and/or on other devices such as a Host 4 computer or specialized network nodes. Gateways 3 may be attached to a wired network such as Ethernet. Different Gateway 3 products may be configured for alternative networks such as Ethernet, WiFi, cellular, RS232, BACnet, LonWorks, or even simply binary switch outputs.

Host A Host 4 may operate on a Windows-based or other computer. A Host 4 may include a secure database for maintaining information such as encryption keys. A Host 4 may also include Host Software, which may provide an interface to the WSN 100, direct data to and from proxies (which may represent some or all of the Routers 2 and/or Star nodes 1) into a database, and offer GUI applications that may present data, allow actuation (if applicable), and support network administration.

In this specification, "node" or "device" may refer to a Star node 1, Router 2, or other networked device. Within the system, Routers 2 and Star nodes 1 may have parent-child relationships, with Star nodes 1 being children of one or more Router 2 parents. Each Star node 1 may have a primary parent Router 2 and, if possible, a secondary parent Router 2 for redundancy. Gateways 3 may also act as parents. In the following pages, we describe network architectures and protocols designed for use in wireless sensor networks. In this discussion, we describe certain illustrative embodiments; however, these descriptions are purely illustrative and are not intended to be limiting.

In discussing network architectures and protocols, we consider many facets of network structure and operation, including network formation, communication, system enhancements, network restructuring, and security. Before discussing these items in depth, we provide an overview of several aspects of the invention, which are described, along with additional features, in more detail subsequently.

The overview of several additional aspects of the invention is provided below with reference to the illustrative embodiment of FIG. 2. The FIG. 2 embodiment is similar to that in FIG. 1, but includes several Gateways 3 that may communicate with a Host 4 via an Ethernet link 50.

Frequency Agility

Figure 2:
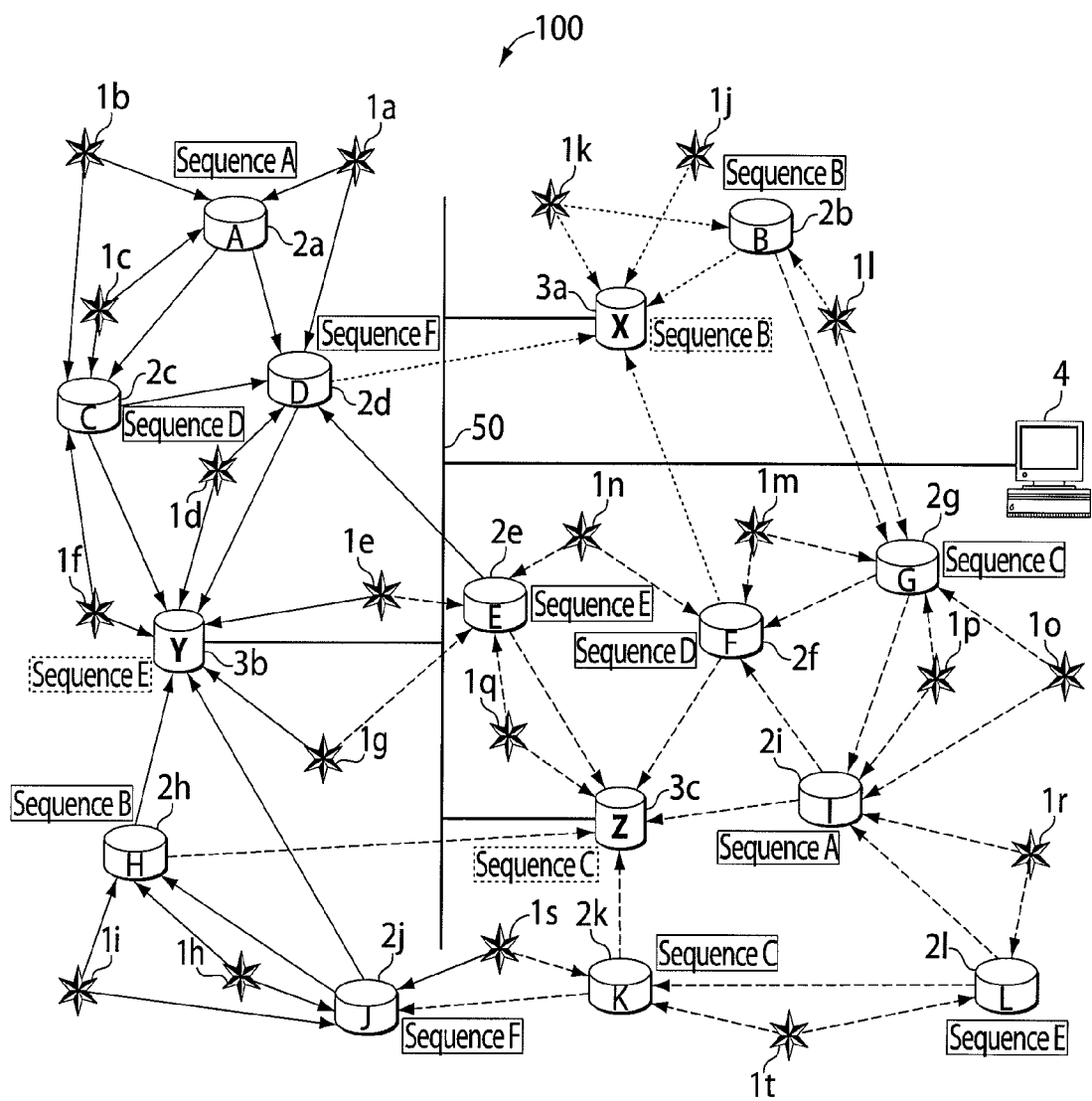
FIG. 2 shows an overview of a system configured according to the invention.

One of the aspects of the invention incorporated into the FIG. 2 embodiment is support for frequency agility, or the ability of a WSN 100 to support communication on multiple frequency channels. In one aspect of the invention, nodes may use two or more different frequency channels in a sequence for communication, e.g., nodes may be enabled for communication at randomized frequencies and/or at randomized times. Channel usage may not necessarily be coordinated across the network; thus, each parent node may utilize a different sequence of channels, depending on such factors as conditions in the radio environment and interference from other nearby wireless devices. For example, in FIG. 2, Router 2a is utilizing channel Sequence A, while Router 2d is using Sequence F and Router 2c is using Sequence D. A Sequence may include or be defined by a specific or randomized sequence of different frequencies used for communication and/or a specific or randomized timing by which the different frequencies are used. This timing by which frequencies are used may define a start time when frequencies are used and/or a length of time that the frequencies are used. Child nodes may know which Sequence is being used by their parent node(s) so that the Child nodes may predict when and on what channel their parents may be available for communication. Each node may also select preferred channels for communication with its parents.

This frequency agile approach may have several potential benefits. For example, frequency agility may help WSNs to overcome some of the difficulties posed by network crosstalk, interference within the frequency band being used, and multipath conditions. These benefits, as well as more detail concerning some embodiments of frequency agile WSNs, are discussed subsequently.

Support for Multiple Gateways

In another aspect of the invention, a WSN 100 may provide support for multiple Gateways 3. In the example in FIG. 2, Gateways 3a (X), 3b (Y), and 3c (Z) are each connected to a Host 4 via a common Ethernet backbone 50. Arrows indicate the flow of data toward the Gateways 3a-c. (Data may flow in both directions over all pathways, but in many WSN applications the bulk of the data may flow toward a Gateway 3.) Each Gateway 3 may have one or more child Routers 2. Some Routers 2 may have children, including other Routers 2 and Star nodes 1, and each Router 2 and Star node 1 may have two parents (e.g., primary and secondary parents). Star nodes 1 may also be children of Gateways 3.

The parent/child relationship may be used to determine the path by which nodes communicate with a Gateway 3. For example, a Star node 1 may communicate with a Gateway 3 via a parent Router 2, which in turn may communicate with its parent Gateway 3. A node may communicate using one or more pathways. For example, a Star node 1 may use a primary path to communicate with a Gateway 3, e.g., via a first parent Router 2 that communicates directly with the Gateway 3. The Star node 1 may alternately communicate with the Gateway 3 via a secondary path, e.g., a second parent Router 2 that communicates with the Gateway 3. Communication paths may be structured in any suitable way, such as having a Star node 1 communicate with a Host 4 via one or more pathways that each include one or more different Star nodes 1 and/or one or more Routers 2 and/or one or more Gateways 3. A node may use a primary path and switch to a secondary path when communication via the primary path is impossible or otherwise impeded. This redundancy may help ensure that communication for each node is maintained.

In a multi-Gateway 3 configuration, a device's secondary path may lead to a different Gateway 3 than the device's primary path. For example, in FIG. 2, Router 2h (H) has a primary path to Gateway 3b (Y) and a secondary path to Gateway 3c (Z). This type of system may be configured so that there is no single point of failure in routing; if a Router 2 or a Gateway 3 fails, there may be another path by which a device can transmit messages. A multi-Gateway configuration also has the advantage that the number of hops to a Gateway 3 may be reduced when Gateways 3 are interspersed among Routers 2.

Connectivity Assessments

In another aspect of the invention, a node may perform one or more connectivity assessments and choose one or more parents. To assess connectivity, a node may listen for messages from nearby Routers 2, so that the node may determine which prospective parents are within range. A node may accomplish this by choosing a frequency channel and remaining on that channel for some period of time, determining which Routers 2 the node can hear, and assessing connectivity to each of those Routers 2. (As discussed in more detail below, Gateways 3 may also accept children. In most of this disclosure, devices that emit beacons and/or support children are called Routers 2, with the understanding that less numerous Gateways 3 also emit beacons and support children. Such use of the word "Router" is not intended to exclude Gateways 3.)

More accurate connectivity assessments may be obtained if the node samples more than one frequency channel. Due to multipath conditions, network crosstalk, and other factors, for example, a node may measure adequate connectivity to Router A on channel 15, but strong connectivity to Routers B and C on channel 23. By assessing connectivity on multiple channels, the node may take full advantage of a WSN's frequency agility, if provided along with a connectivity assessment feature in a network.

Thus, to perform connectivity assessments, a node may listen for messages from Routers 2 on one channel, collect connectivity information, switch to a new channel, collect addition information (potentially from different Routers 2), and so on. Based on connectivity assessments at multiple frequencies, the node may be able to select its parent Routers 2 (or provide information to the Host 4 for selection) from among the Routers 2 it can hear best at different frequencies, rather than restricting its choices only to those Routers 2 that can be heard at a particular frequency. Such assessments may be similarly useful in selecting the node's preferred communication channels.

Virtual Proxy Devices

In another aspect of the invention, a WSN 100 may support a set of software objects that may be accessible at the Host 4 via TCP/IP or other suitable protocol. These software objects, or proxies, may provide an abstraction of the network for application programs, whereby each WSN device may be represented as a software object. Examples of proxy objects may include nodes, sensors, and actuators. The proxies may handle the details of keeping the virtual devices on the Host 4 consistent with the physical devices on the network and may automatically track time-variant network information such as sensor state, device connectivity, and network configuration.

The proxies may be used, for example, to pass information to and from specific applications. Requests for data by application programs may be directed to the proxies. Such requests may be handled with recent data that is already available to a proxy. Alternatively, new data may be sent to the proxy prior to the proxy's response to the request for data. Requests to change network devices may be similarly directed to the proxies; the proxies in turn may handle the details of changing the network in reaction to changes in the software objects.

Joining the Network

Figure 3:
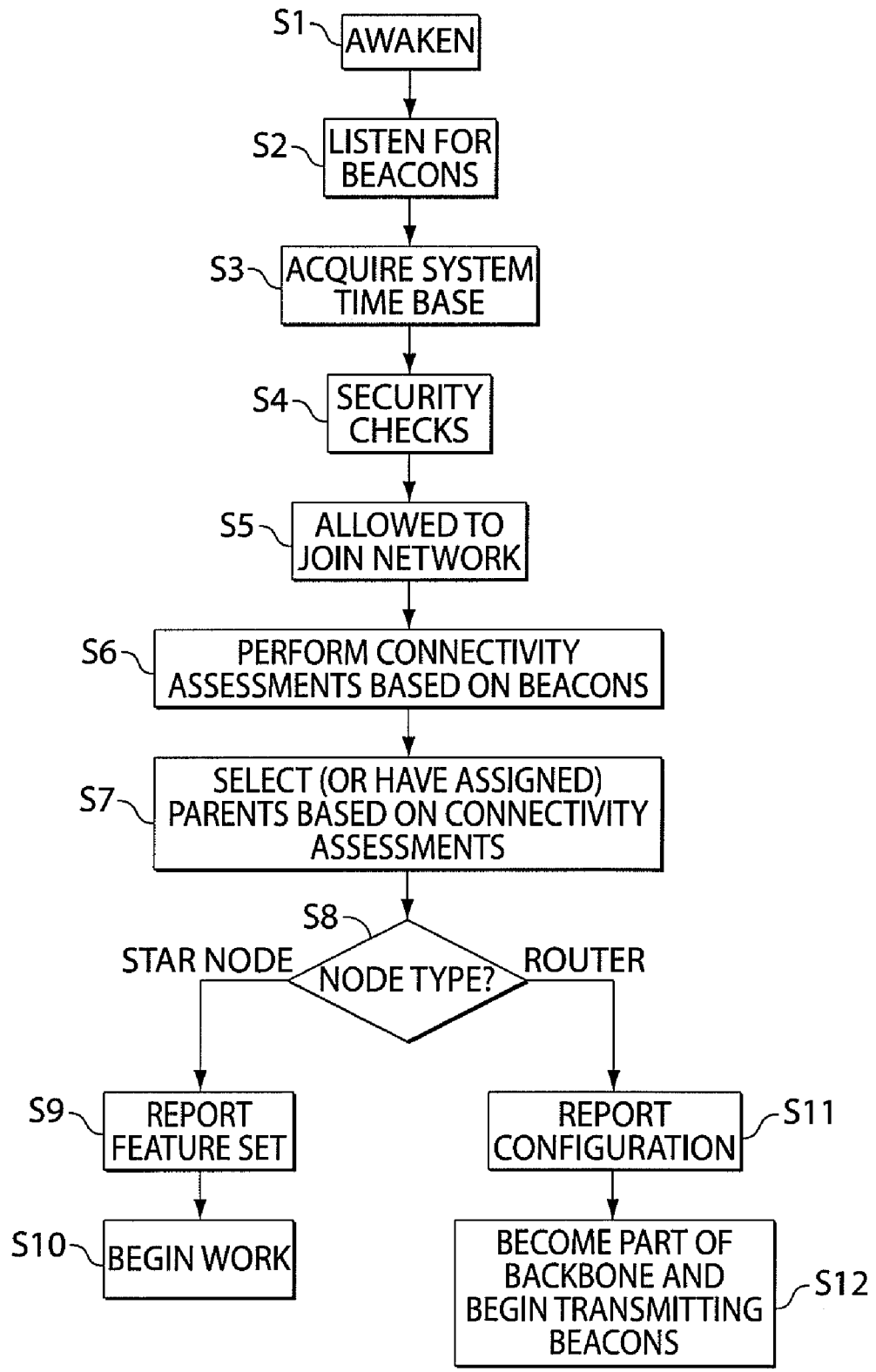
FIG. 3 illustrates the process of a node joining a WSN.

In another aspect of the invention, a node may join a WSN 100 by a simple procedure, as shown, for example, in FIG. 3. When a node first awakens (S1), it may need to acquire the time base of the system by listening for messages (called "Beacons") from Routers 2 that have already joined the network (S2). Once it has acquired the time base of the system (S3), the node may communicate with at least the Router(s) 2 from which it heard the Beacons.

Before it is allowed to join the network, the node may need to pass through some optional security checks (S4), such as for authentication. Network encryption keys may be securely provided to the node as part of the authentication process.

Once a node has associated with the network (S5), it may acquire its parents. To do this, the node may listen for Beacons, perform connectivity assessments (S6), and choose its parents (S7). Alternatively, it may report connectivity data to a Host 4 that chooses parents on behalf of the node.

At first, a device may simply join the network as a Generic node. Once a node has joined the network, a distinction may be made between Routers 2 and Star nodes 1 (S8). If the node is a Star node 1, then it may report its feature set (S9) and begin its work (S10) (for example, collecting and reporting sensor data if it is a sensor-attached Star node 1). If the node is a Router 2, it may report its configuration (S11) and routing information to its parents, become part of the network backbone, and begin transmitting Beacons (S12).

Having introduced several, but not necessarily all, aspects of the invention, a more detailed discussion of illustrative embodiments in accordance with aspects of the invention is provided below.

Basic Functions in Wireless Sensor Networks

In this specification, some WSN coordination functions may be handled by a Gateway 3 and software at the Host 4. Gateway 3/Host 4 functions may include starting sessions, acting as a clearinghouse for device IDs, and other functions (some of which are described in later sections). Gateway 3/Host 4 functions may be provided by a single device or by multiple devices, such as a primary Gateway 3, a secondary Gateway 3 for redundancy, and a computer running application software at the Host 4.

In one embodiment, WSN coordination functions may be handled by a service running under Microsoft Windows on a Host 4 PC. The primary and secondary Gateways 3 may be connected to the Host 4 PC by an RS232 connection. It is not necessary that the Host 4 be a PC running Windows and connected to a network. For example, a Host 4 may be a Windows workstation or an embedded device running Windows Embedded, Windows CE, or Linux. A specially programmed Gateway 3 may fulfill the Host 4 function in small networks. Multiple Gateways 3 may fulfill Host 4 functions in a distributed fashion on larger networks.

TCP/IP packets may be used to communicate between services. For example, a WSN coordination service may send data to a GUI. The services need not be on the same machine. For example, the WSN coordination service may reside on one machine, while the GUI may reside on another.

To maintain reliability, packets sent from a given node may require acknowledgement back from the receiving node. If the acknowledgement is not received, the sending node may re-transmit its message. This helps to ensure that data will not be lost if there is a problem with network communication.

During normal operation, nodes may periodically send "heartbeats" to their primary and secondary parents. Heartbeats may be used to poll parents for pending store-and-forward messages. Heartbeats may also indicate that no one has tampered with a node. Generally, heartbeats and other functions described herein help maintain WSN health on a decentralized basis.

WSNs and IEEE 802.15.4

IEEE 802.15.4 defines a radio networking protocol that is simple, inexpensive, and low power. It is intended to operate in unlicensed, international frequency bands. Targeted applications include wireless sensors, interactive toys, smart badges, remote controls, and home automation.

Aspects of the IEEE 802.15.4 specification may be incorporated into a WSN in embodiments of the invention, albeit with some modification as described below. For example, IEEE 802.15.4 provides Medium Access Layer (MAC) primitives for Routers 2 and Star nodes 1 to communicate, but the standard does not provide a way for Star nodes 1 to communicate with other Star nodes 1, nor does it specify how Routers 2 configure themselves into a network. In this specification, Routers 2 roughly correspond to IEEE "full-function devices" (FFDs), while Star nodes 1 correspond to "reduced-function devices" (RFDs).

Figure 4:
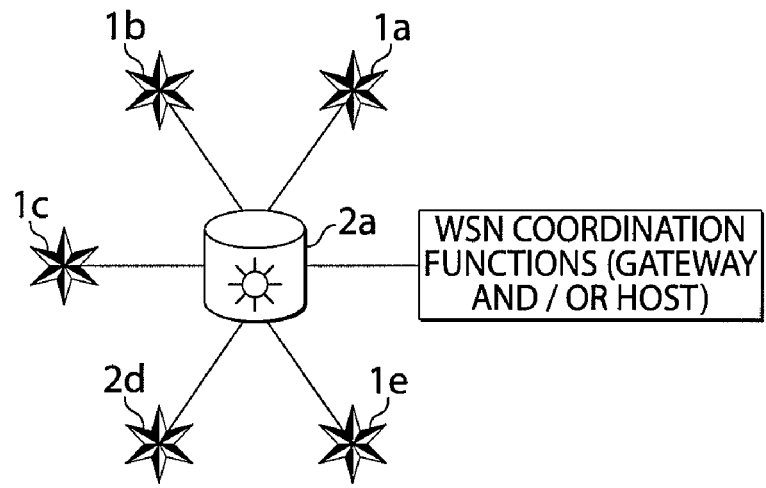
FIG. 4 shows an example of a WSN with a simple hub-and-spoke configuration.

FIG. 4 shows an example of a WSN 100 with a simple hub-and-spoke configuration. IEEE 802.15.4 is designed for this simple sort of configuration, with a single parent and a set of children within the parent's sphere of influence, where parents may be Gateways 3 or Routers 2 and children may be Star nodes 1 or other Routers 2. In this specification, we do not intend to limit our discussion to WSNs with a single parent and its children; the concepts described herein may refer to expanded WSNs with multiple Gateways 3 and Routers 2 such as the example pictured in FIG. 2.

The IEEE 802.15.4 standard includes a set of protocols that are designed to allow the Star nodes 1 to sleep most of the time, allowing them to be battery powered. The Routers 2, by contrast, are intended to be awake most of the time, available to respond instantly if a child node needs immediate service. Thus, a Star node 1 may detect an alarm condition and immediately send a message to a nearby Router 2. To quote from the standard, "The PAN coordinator [i.e., Router 2] may be mains powered, while the devices [i.e., Star nodes 1] will most likely be battery powered." This specification builds upon the IEEE 802.15.4 specification to support Routers 2 operating in a power-saving mode in which they wake up frequently (such as twice per second) and for brief periods of time.

Figure 5:
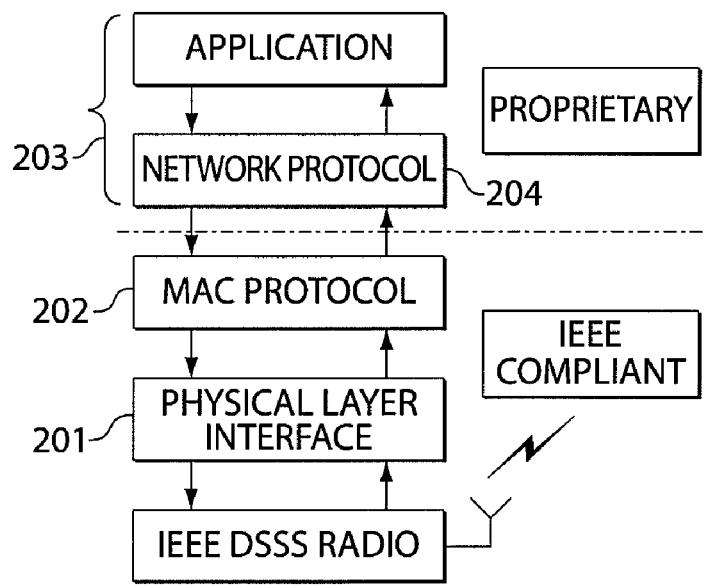
FIG. 5 shows an overview of the layered structure of a WSN according to the invention.

As shown in FIG. 5, a WSN software stack 203 may be built on the base of the PHY 201 and MAC 202 layers of the IEEE 802.15.4 standard, extending it with a robust network layer 204. In an alternative embodiment, the 802.15.4 Direct Sequence Spread Spectrum (DSSS) physical layer 201 may be replaced with a Frequency Shift Keyed (FSK) frequency hopper in the 902-928 MHz. Alternative radios operating in different frequency bands are also an option.

In accordance with aspects of the invention, network configuration in a WSN 100 may be ad hoc, allowing Star nodes 1 (which may support sensors or actuators) to enter or leave the network regularly, as well as eliminating the requirement that Routers 2 remain permanently stationary. Communication between parents and their children may be built upon the MAC layer defined in the IEEE 802.15.4 standard. A NET layer, built upon the MAC layer, may handle communication among Gateways 3 and Routers 2.

In one embodiment, devices used in a WSN 100 may use an IEEE 802.15.4-compliant radio such as the Chipcon CC2420, combined with a processor such as the Texas Instruments MSP430 processor. The MSP430 processor is a suitable choice due to its power saving capabilities, especially its ability to run at low voltage. The Chipcon CC2420 has the physical layer built-in, as well as parts of the MAC, such as AES-128 encryption, CRC check, and MAC-level acknowledgements. The rest of the MAC and the network layer may be implemented using a separate microprocessor.

Figure 6:
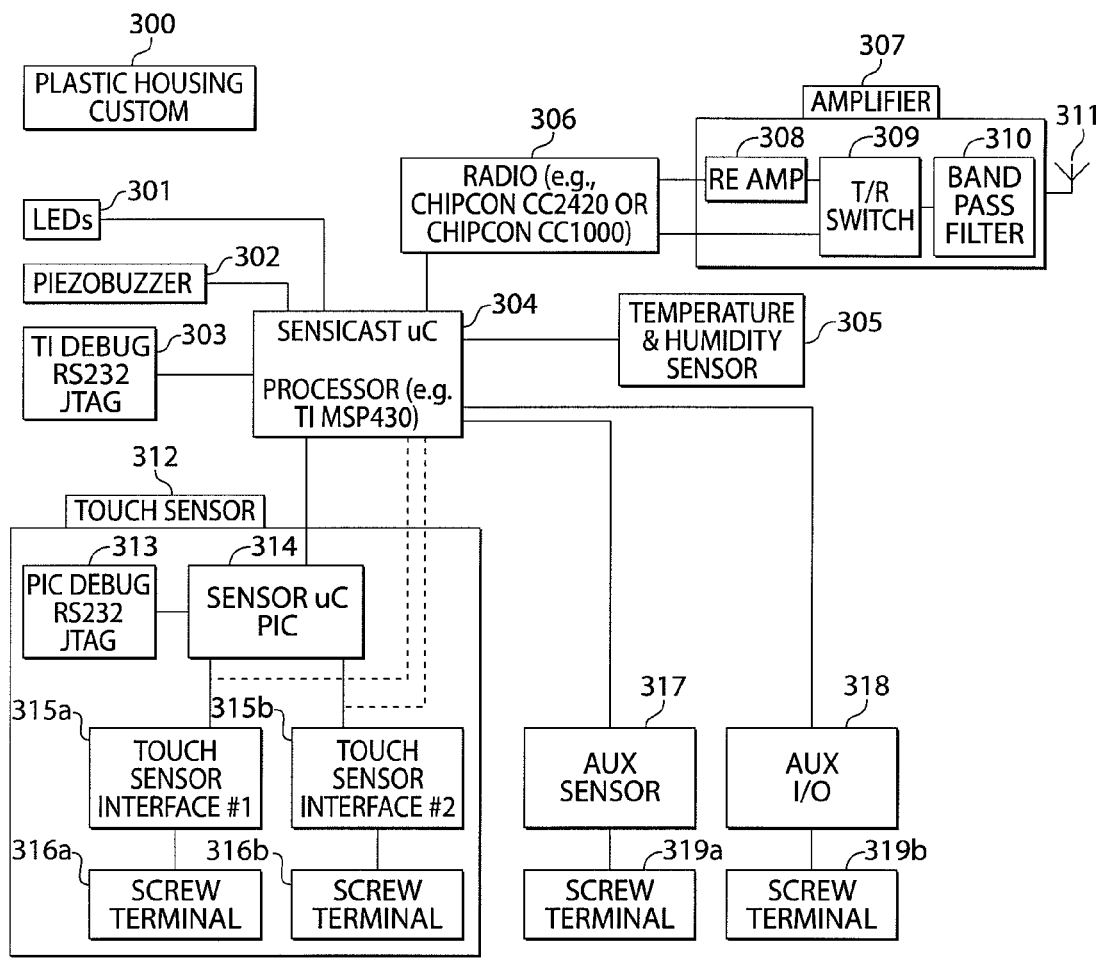
FIG. 6 is a block diagram of a WSN node.

In another embodiment shown in FIG. 6, devices used in a WSN 100 may use a narrowband radio such as the Chipcon CC1000 radio running in the 902-926 MHz unlicensed band, combined with a processor such as the Texas Instruments MSP430 processor. Embedded software may be written in the C programming language. CC1000 radios have limited output power, and a power amplifier (that may be included in a custom radio circuit) may provide additional link margin. A plastic housing 300 may surround the node electronics, which may include LEDs 301; a piezobuzzer 302; an RS232 interface 303; a radio 306; an amplifier 307 (if needed), which may include an RF amplifier 308, a transmit/receive switch 309, and a band pass filter 310; an antenna 311; a processor 304; specialized sensors such as a temperature/humidity sensor 305 and a touch sensor 312, which may incorporate an RS232 interface 313, a processor 314, touch sensor interfaces 315, and screw terminals 316; and auxiliary interfaces, which may include an auxiliary sensor 317, an auxiliary PO interface 318, and screw terminals 319.

The PHY and MAC layers used in illustrative embodiments of the invention may differ from the 802.15.4 PHY and MAC layers, such as to support the use of frequency hopping or adaptive frequency agility. Nonetheless, it is preferable to generally follow the structure of the IEEE 802.15.4 standard to retain compatibility with a range of highly integrated chips expected to be available from multiple vendors. Aspects of the invention are designed to provide the advantages, for example, of frequency agility within the pre-defined IEEE paradigm and constraints.

IEEE 802.15.4 does not address NET and APP layers, so a WSN 100 may add its own NET and APP layers. WSN devices may also include an interface for sensors and/or actuators.

Although WSNs in accordance with various aspects of the invention may borrow some structure and terminology from 802.15.4, there are some fundamental differences. For example:

Routers 2 may be strung together into a network providing connectivity among Star Nodes 1, Routers 2, and Gateways 3, for example, as illustrated in FIG. 2.

In 802.15.4, Nodes start out as orphans and then associate with one and only one Coordinator. In the structure described in this specification, each Node may associate with multiple parents, such as a primary and a secondary Router 2 for redundancy.

One embodiment herein utilizes FSK modulation and 900 MHz radios with frequency hopping, and another embodiment uses IEEE 802.15.4 radios at 2.4 GHz with DSSS communication and QPSK modulation. The techniques described may be similarly applied to either type of system. The modulation may simply be used as a way to carry data, and thus the techniques described herein may be applicable regardless of the type of modulation used. Similarly, although 802.15.4 may use different (and fewer) channels than a narrow band radio, the same techniques may be applied in roughly the same manner in both 802.15.4 and the proprietary radios. Thus, although many of our points below are illustrated using IEEE and FSK radios as example implementations, this is not intended to be limiting.

Frequency Agility Implementation

Radio communication systems with frequency agility (i.e., using multiple frequency channels) may have several benefits over systems using a single channel for communication. For example, if nearby devices are operating in a cross-interfering frequency band, a system with frequency agility may retry communicating on a different and hopefully non-interfering channel. Similarly, if multipath problems affect communication, localized multipath conditions are likely to change when the system shifts to a different frequency.

Figure 7A:
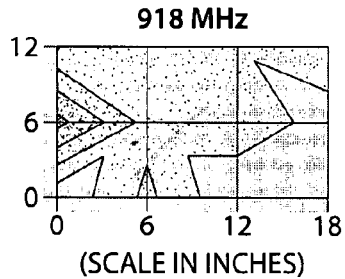
FIG. 7 illustrates the effect of changing frequency on a radio environment.
Figure 7B:
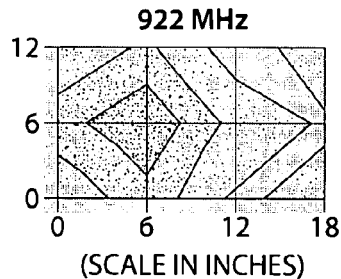
Figure 7C:
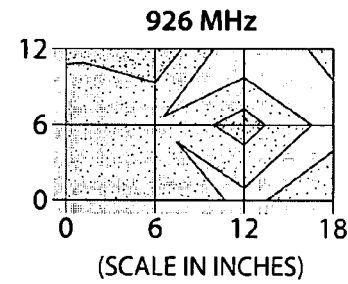

The effect of changing frequency on the radio environment is illustrated in FIGS. 7A-7C, which depict signal strength using a narrowband radio for transmission, and a spectrum analyzer measuring received signal strength at six-inch increments shown on the grid. Data was taken in a typical indoor office environment, in the same location but at 918 MHz for FIG. 7A, 922 MHz for FIG. 7B, and 926 MHz for FIG. 7C. Light shades indicate strong signals, while darker shades indicate nulls, in 5 dBm increments. As FIGS. 7A-7C show, dramatic differences in signal strength can result from slight changes in the signal environment, such as moving transmitters or receivers by just a few inches. The experiments also show that changing the frequency around a relatively narrow band helps; a frequency change of even a few MHz can result in a dramatically different pattern of nulls. Frequency agility thus makes a system tolerant to nulls. With frequency agility, nulls will occur but are likely to evaporate if the sender retries on an alternative frequency.

In accordance with one aspect of the invention, frequency agility may be especially useful in WSNs. In a redundant mesh network, it may not be unusual for ten or more Routers 2 and potentially hundreds of Star nodes 1 to be within range of each other. If all nodes were operating at the same time and in the same frequency channel, such sharing of a channel might result in substantial network crosstalk. Three strategies may be used to overcome such an issue. First, the randomized nature of the Router's wake cycles makes it relatively unlikely that two given Routers 2 will be operating at the same time, unless their wake cycles are explicitly synchronized in a parent/child relationship. Second, if two unrelated Routers 2 happen to be operating at the same time, the randomized use of available radio channels makes it unlikely that they will be able to hear each other. Third, in the relatively infrequent event that two Routers 2 happen to be operating in the same frequency and at the same time, the CSMA-CA scheme in IEEE 802.15.4 enables the Routers 2 to share the channel. The result is that each Router 2 and its children can operate as envisioned in the IEEE specification, relatively undisturbed by nearby Routers 2 and their children. Thus, using aspects of the invention, the hub-and-spoke clusters envisioned by IEEE may be strung together into a scalable and extensive mesh network.

Two types of frequency agility approaches are discussed below, adaptive frequency agility and frequency hopping, which may be incorporated into embodiments of the invention. Other frequency agility approaches are possible, as those discussed below are not intended to limit aspects of the invention.

Adaptive Frequency Agility

In one embodiment, the WSN architecture may utilize adaptive frequency agility (AFA). In the IEEE 802.15.4 standard, sixteen DSSS (direct sequence spread spectrum) frequency channels are available in the 2400-2483 MHz band for communication between networked devices. The channels operate at 2 megachips and 250 kbps, spaced at intervals of 5 MHz. A system installer may configure the system to use from one to sixteen operating channels, including "control channels."

Control channels are the channels that an unassociated node checks before joining the network. One, two, three, or more control channels may be designated for this purpose as an installation parameter. The use of more than one control channel allows a node to detect nearby Routers 2 even if there is a problem on one channel due to multipath or radio interference. Generally, channels 15 (2425 MHz) and 20 (2450 MHz) are good choices for control channels, as they lie midway between the commonly used 802.11b channels 1 (2412 MHz), 6 (2437 MHz), and 11 (2462 MHz).

In one embodiment, a WSN 100 may utilize adaptive frequency agility (AFA) among up to 16 available channels (11-26) in a pseudorandom sequence. Supported channel sequences may be written into the memory of the nodes at manufacture, to be selected when the system is operating. Alternatively, a sequence of 16 channels may be expressed in one-half byte per channel, and thus specified in 8 bytes that can be transmitted wirelessly to and from a Router 2. Supported sequences might include:

Sequence A
26,19,12,18,25,20,14,24,16,11,21,13,23,17,22,15
Sequence B
15,22,17,23,13,21,11,16,24,14,20,25,18,12,19,26
Sequence C
20,25,19,26,16,21,11,15,24,14,23,13,18,22,17,12
Sequence D
12,17,22,18,13,23,14,24,15,11,21,16,26,19,25,20
Sequence E
25,11,17,22,15,20,24,14,23,16,21,13,19,26,18,12
Sequence F
12,18,26,19,13,21,16,23,14,24,20,15,22,17,11,25

Through software at the Host 4, a user may select which pseudorandom sequence is used. Alternatively, sequences may be randomly assigned or selected for or by the Routers 2, or randomly generated by or on behalf of each Router 2.

Each Router 2 may choose a set of channels for its communications based on a combination of user configuration and adaptive algorithms. Some of the ways that Routers 2 may adapt are described in more detail below.

In one embodiment of an AFA system, Routers 2 may periodically transmit messages called Frame Beacons. These Frame Beacons may be very short, on the order of two milliseconds each. At two milliseconds, one Frame Beacon per second uses about 0.2% of the channel bandwidth. In one embodiment, Frame Beacons may serve several purposes:

Frame Beacons may start a "contention access period," which is a period during which Child nodes may initiate communications with a Parent (Router 2 or Gateway 3) and vice versa. Frame Beacons may signal the availability of the Parent for communication on a particular frequency channel for a period of time.

Frame Beacons may multicast a synchronized time base to their child nodes.

Frame Beacons may include scheduling information for future Frame Beacons so that other nodes can predict the availability of a given Router 2, thus synchronizing their sleep periods with the Router's scheduled operation. A Frame Beacon may contain one or more of the following:

PHY Header
MAC Header
WSN ID
Session ID (that may be used to distinguish between network communications sessions, such as when a network times out and reforms)
Router ID
Current time
Last time network parameters changed
Current offset into pseudonoise sequence table (that may be used to calculate dither)
Current offset into AFA Sequence table (that may be used to determine the currently active communications channel)
List of Children with store-and-forward message in the queue (as described subsequently)

To provide a full context for the incremental status information in the Frame Beacon, children may query a Router 2 separately to learn the hop sequence, Frame Beacon timing parameters, and other information that is specific to a network session and/or Router 2 and does not normally vary during a session.

Figure 8:
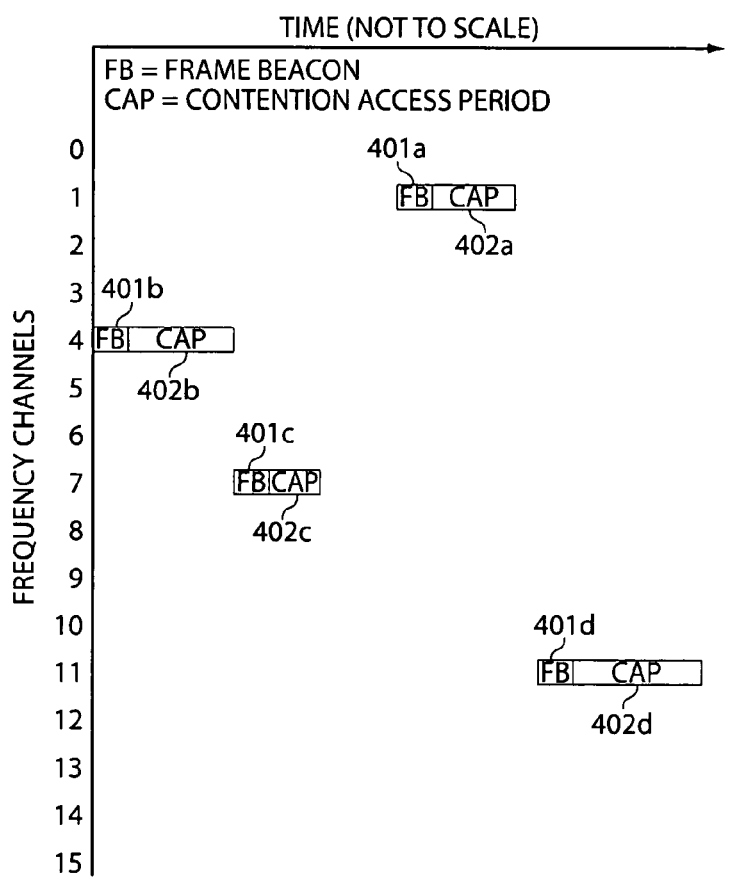
FIG. 8 illustrates transmission of Frame Beacons and Contention Access Periods at different frequencies over time.

Referring to FIG. 8, a Router 2 may transmit a Frame Beacon 401 to start a contention access period (CAP) 402 on a particular frequency channel. The CAP 402 is a time window when the Router 2 is available to communicate with its Children on a particular channel. The CAP 402 may be relatively long, on the order of 0.1 to 0.5 second. The Router's Children may contend for the channel using CSMA-CA (carrier sense multiple access with collision avoidance). Various types of channel access mechanisms may be used, depending on the network configuration. Unslotted and/or slotted channel access may be employed as specified in IEEE 802.15.4.

Networks may use an unslotted CSMA-CA channel access mechanism. Each time a device wishes to transmit data frames or MAC commands, it may wait for a random period. If the channel is found to be idle, following the random backoff, it may transmit its data. If the channel is found to be busy, following the random backoff, the device may wait for another random period before trying to access the channel again. Acknowledgment frames may be sent with very short latencies and without using a CSMA-CA mechanism.

Alternatively, networks may use a slotted CSMA-CA channel access mechanism, where the backoff slots are aligned with (for example) the start of Beacon transmission. Each time a device wishes to transmit data frames during the CAP 402, it may locate the boundary of the next backoff slot and then may wait for a random number of backoff slots. If the channel is busy, then following this random backoff the device may wait for another random number of backoff slots before trying to access the channel again. If the channel is idle, the device may begin transmitting on the next available backoff slot boundary. Acknowledgment and Beacon frames may be sent with very short latencies and without using a CSMA-CA mechanism.

A Router 2 may select the timing of Frame Beacons 401, as well as the channel on which they are transmitted at a given time, through a combination of user configuration and adaptive algorithms. The timing and channel of Frame Beacons 401 may be regular and pseudorandom. For example, a Router 2 may be set to send a Beacon every 0.50 seconds, with a randomized dither of plus or minus 0.10 seconds. The randomized dither may be calculated using a linear congruential generator of the form in Equation 1:

$$R_{n+1} = (a \cdot R_n + b) \bmod m \quad (1)$$

The values a (the multiplier), b (the increment), and m (the modulus) are pre-selected constants. The choice of constants is well studied in the computer science literature.

Transmission of the value $R_n$ with each Frame Beacon 401 may allow a node to "lock on" to the Router's pseudorandom number sequence. This in turn may be used to forecast the timing of future transmissions, thus allowing the node to wake up and sample the channel at the time a transmission is expected.

Alternatively, and for less computational complexity, the dither may be derived from a lookup table that is shared across the network.

These two techniques may be combined, with a linear congruential generator used to generate a table of a sequence of x pseudorandom numbers. A device wishing to duplicate the table and synchronize with the Router 2 may need the pseudorandom seed used to generate the table, the table length, and the current offset into the table.

For example, a node may use a seed in a linear congruential generator to generate a table of 32 pseudorandom numbers. Each of the table entries may be taken as a dither amount. For example the low-order 7 bits may be used to set the dither in milliseconds, resulting in a dither of ±128 milliseconds (approximately ±0.1 seconds). Thus a Router 2 may send a Frame Beacon 401 every 0.5 sec ±a randomized dither from the table. In this example, the true time to cycle through a table of 32 entries would be 16 seconds±(sum of all 32 randomized dithers). In this example, if a node is asleep for 90 seconds, the node may synchronize with its parent Router 2 thusly. First, the integer portion of 90 seconds divided by (16 seconds±(sum of 32 randomized dithers)) will calculate the amount of time to return to exactly the current position in the table. The remainder may be used to calculate the Router's scheduled wakeup time that most closely approximates the child's desired 90 second sleep cycle.

Using one of the above methods and a synchronized time base, a node may synchronize itself to its Router's schedule of Frame Beacons 401. Thus, a child node may precisely time its wake cycles to coincide with its parent's operation.

As part of a configuration process, a Router 2 may be instructed to send a Frame Beacon 401 once every y seconds (e.g., once every 0.5 seconds±a randomized dither). The system may then select one of several available table-driven sequences of channels. Also as part of the configuration process, the Router 2 may be instructed to send a Frame Beacon 401 on each control channel at least once every z seconds (e.g., once every three seconds), inserting extra unscheduled beacons if necessary to achieve this criterion. This may enable a new device to scan first one channel for z seconds and then another channel for z seconds to join the network.

It is not strictly necessary for every CAP 402 to begin with the transmission of a Frame Beacon 401. For example, every third CAP 402 may start with a Frame Beacon 401, with the other frames occurring on a known schedule but without beacons. A node that has been asleep for a long time may need to hear a Frame Beacon 401 to synchronize its time to its parent's, but once the time is synchronized it may participate in CAPs 402 that are not initiated with Frame Beacons 401. This strategy can save both energy and bandwidth.

The timing and/or duration of a Router's CAPs may be adaptive. For example, if a disproportionate amount of a Router's traffic is concentrated in certain channels (presumably due to poor connectivity on other channels), the Router 2 may make itself available more often or for a longer period of time on those channels, for example as illustrated in FIG. 8. Conversely, if a Router 2 detects no network traffic for the first few milliseconds or slots of a CAP 402 on a particular channel, the Router 2 may simply go into low-power mode until the scheduled time for its next CAP 402. Similarly, if a frequency channel is very active, the Router 2 may remain in operation on that channel until it is time for the next CAP 402 on a different channel. If certain channels become overused, the Router 2 may reconfigure itself to for more frequent CAPs 402 on those channels, and/or instruct its children to favor alternative channels.

Channels and CAPs 402 in an AFA system are not necessarily coordinated across the network. Each Router 2 may be available on different channels and/or at different times. Each link in the network tree may use a different frequency if that is what works best. For example, node A may find that channel 20 works best for its communication with Router B, but node C may find that channel 15 works best for its communication with the same Router B. Thus, the adaptive frequency agility of the proposed scheme may be link-by-link, rather than system-wide.

In highly optimized systems, Routers 2 may coordinate their activities so that nearby Routers 2 operate at different times and/or at different frequencies. For many sensing applications, such optimization may be unnecessary or even counterproductive, as the data sources and sinks (typically Star nodes 1) may be on a very low duty cycle, and throughput requirements may not be very stringent. Thus, in a typical configuration, each Router 2 may run on its own pseudorandom schedule, with the possibility of packet collisions across Routers 2. Randomization of Frame Beacon timing and frequency as described above will prevent such collisions from occurring on a frequent or repetitive basis. Such inter-Router 2 collisions, when they occur, may be handled by the IEEE 802.15.4 CSMA-CA scheme.

In one embodiment, nodes attempting to join the network may test the quality of available channels and pick the best two (a primary and a secondary) based on signal strength, direct sequence correlation quality, and similar metrics described subsequently. Once a node finds specific channels that provide good connectivity with a parent, it may select those channels for communication. When feasible, the node may pick channels that are in different parts of the 2400-2483 MHz spectrum to gain the full advantages of frequency diversity. The node may schedule its activities to use these channels when they are available.

In an alternative embodiment, a node may simply always use the most recent channel that worked. The node may continue to use that channel until there is a communication problem. The result of this approach is that individual nodes will tend to stick with working channels and quickly bypass channels that are problematic.

The choice between these two approaches may be driven by the stability of the radio environment, the amount of program memory available in the nodes, and similar factors. The two approaches may be mixed, for example, with each approach corresponding to a mode of operation for a given node. A node may switch between modes adaptively.

If a node's preferred channels prove problematic (as indicated by lack of acknowledgements in communications with a node's parents), the node may automatically re-survey the available channels and switch to a different pair of channels, or the node may simply switch to the next available channel. Thus, over time system operation may adapt. For example, if there is an 802.11b system operating nearby, over time nodes may detect interference on certain channels and may switch their operation to a different portion of the 2400-2483 MHz band. For example, if 802.11b is operating on channels 1 (2412 MHz), 6 (2437 MHz), and 11 (2462 MHz), an adaptive 802.15.4 system may, over time, tend to move to channels 15 (2425 MHz) and 20 (2450 MHz). If Routers 2 begin to interfere with each other due to concentrating communications on certain channels, the adaptive nature of the system will tend to spread use to other channels. Thus the system will over time move in a randomized way toward an optimized equilibrium state, but one that will change with changing requirements and with the environment.

Frequency Hopping

In some instances, regulatory requirements may preclude the use of AFA systems. In such cases, a frequency hopping (FH) system (in which devices on the network may hop from one frequency to another in unison, in a set pattern, and on a set schedule) may be used. Although radio communication with FH may share some of the benefits of AFA, FH systems may have some disadvantages as applied to mesh networks. Maintaining balanced operation on 50 or more channels (a regulatory requirement) requires substantial protocol overhead. Also, FH systems generally do not "learn" which channels work best and which channels are best avoided due to cross-interference from other users of the spectrum. In fact, under FCC rules, a frequency hopper is expected to use all channels equally and not avoid use of channels that are known to be problematic. Despite these drawbacks, FH is preferable to single-channel operation in mesh networks. Still, when regulations do not require FH, it is preferable to use an AFA system, achieving the benefits of frequency diversity without corresponding inefficient utilization of the radio spectrum and unnecessary use of battery power.

In one embodiment, the WSN architecture may utilize FH among 50 possible channels (0-49). The system may change state every 400 ms, or 2.5 times per second as required by FCC rules. During this 400 ms, in a particular embodiment developed by the inventors, the radio may transmit data on its channel for up to 360 ms, may transmit an FH Beacon for up to 11.6 ms, and may be idle for at least 28.4 ms. The system may hop according to a pseudorandom sequence (FH Sequence). In one embodiment, supported hop sequences may include:

Sequence A
20,42,8,33,1,37,15,49,14,34,16,31,7,36,21,48,9,41,23, 5,22,39,13,38,18,43,3,44,25,2,28,47,0,29,10,27,12,30, 4,26,11,35,17,32,6,46,24,40,19,45

Sequence B
45,19,40,24,46,6,32,17,35,11,26,4,30,12,27,10,29,0,47, 28,2,25,44,3,43,18,38, 13,39,22,5,23,41,9,48,21,36, 7,31,16,34,14,49,15,37,1,33,8,42,20

Sequence C
9,30,14,1,24,40,18,34,15,5,45,28,46,4,25,35,0,39,10, 20,38,13,31,12,48,33,21,36,3,47,16,2,19,43,7,49,6,29, 17,32,22,41,23,37,27,44,11,42,8,26

Sequence D
26,8,42,11,44,27,37,23,41,22,32,17,29,6,49,7,43,19,2, 16,47,3,39,21,33,48,12,31,13,38,20,10,39,0,35,25,4, 46,28,45,5,15,34,18,40,24, 1,14,30,9

Sequence E
45,30,0,29,14,46,28,6,35,4,43,11,49,9,38,12,34,13,36, 18,3,21,42,27,10,40,25,5,24,8,26,7,32,47,15,41,20,39, 2,22,37,19,44,23,1,17,33,48,31,16

Sequence F
16,31,48,33,17,1,23,44,19,37,22,2,39,20,41,15,47,32,7, 26,8,24,5,25,40,10,27, 42,21,3,18,36,13,34,12,38,9,49, 11,43,4,35,6,28,46,14,29,0,30,45

Through software at the Host 4, the user may select which pseudorandom sequence is used.

In one embodiment, an entire WSN 100 may utilize the same hop schedule, with all interconnected Routers 2 hopping together. If multiple separate WSNs 100 are used within a single facility, each separate WSN 100 may use a different hop schedule. In another embodiment, the system may allow different Routers 2 to operate on different hop sequences by selecting one of the available hop patterns for each Router 2.

FH Beacons may be used to establish the time base of the FH system. An FH Beacon may contain one or more of the following:

Network ID

Session ID (that may be used to distinguish between network communications sessions, such as when a network times out and reforms)

Which FH pattern is being used (FH Sequence)

A hop index

How much time is left in the current hop (relative to the network; this may help to synchronize the network and to correct for drift)

FH Beacons may provide enough information for nodes to discover which network is transmitting the FH Beacons and the timing for that network.

FH systems generally hop on a fixed-length schedule without randomization in the timing. While this is an acceptable strategy for a single hub-and-spoke network, substantial crosstalk can result when several mesh nodes share a single frequency hopping schedule. For example, beacons simultaneously transmitted at the beginning of each frequency transition would result in collisions between Routers 2. Thus, in such FH systems the timing of the beacons may be randomized within a network-wide CAP 402.

Figure 9:
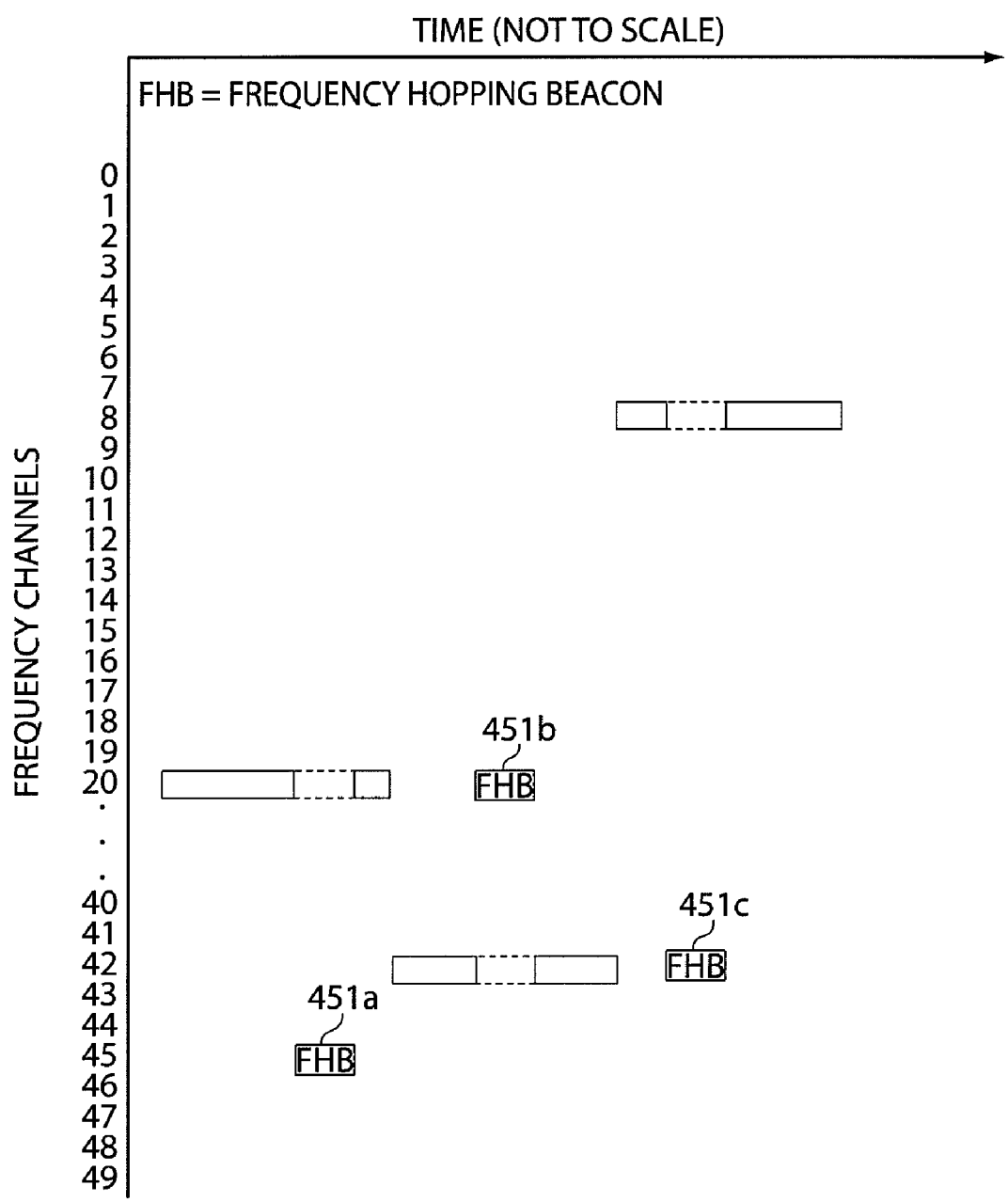
FIG. 9 illustrates transmission of the FH Beacon on the previous channel using a portion of Hop Sequence A as an example.

When FH Beacons are transmitted by multiple Routers 2 at a random time during each hop, they may begin to "clutter up" the shared channel by interfering with other network traffic. In order to prevent this, the system may transmit the FH Beacon on the previous channel or the subsequent channel in the shared frequency hopping sequence. FIG. 9 illustrates transmission of the FH Beacon 451 on the previous channel using a portion of Hop Sequence A as an example.

In one embodiment of an FH system, each 400-ms hop may comprise a 360-ms data state (or CAP 402) and a 40-ms idle or non-data state. Packet transmissions may occur during the data state; packet transmissions may not begin during the idle state. At some time during the data state of each hop, a Router 2 or Gateway 3 may be "deaf" as it briefly returns to the previous channel to transmit an FH Beacon 451. The time during the data state at which this occurs may be random or pseudorandom; however, if the Router 2 or Gateway 3 is in the middle of a data transmission, reception, or transaction at the chosen time, the node may wait until the operation is completed before it returns to the previous channel to transmit the FH Beacon 451.

A further modification may be made so that all Routers 2 do not emit FH Beacons 451 on identical channels: Instead of the whole system transmitting FH Beacons 451 on the next or previous channel, different Routers 2 may be instructed to send FH Beacons 451 on different offsets. For example, Router 2 (A) may be instructed to send an FH Beacon 451 on the channel that is +25 channels in the sequence, while Router 2 (B) may be instructed to send an FH Beacon 451 on the channel that is −13 channels in the sequence. The FH Beacon offset may be set differently for each Router 2, but once an offset is fixed for a Router 2, it may remain that way. For example, if frequency hopping Sequence A is being used and the system is at channel 20, and Beacon transmission at channel 20 may interfere with other network traffic, Router 2 A may send an FH Beacon 451 on channel 43 (+25 in the sequence from channel 20) and Router 2 B may send an FH Beacon 451 on channel 30 (−13 in the sequence from channel 20). This approach does not bias the system in favor of any particular channel.

For example, a 902-928 MHz FH implementation by the inventors utilizes a 19.2 kbps FSK radio. During a 400 ms "frequency hop" window the radio may: transmit data on its primary channel for up to 360 ms, transmit an FH Beacon 451 on its secondary channel for up to 11.6 ms, and remain idle for an inter-hop period of at least 28.4 ms. The radio may be physically incapable of transmitting on more than one channel at any given time. By maintaining a fixed offset in the frequency table between the primary and FH Beacon channels, this scheme may ensure that no channel is occupied for more than 400 ms in any 20-second period as required by FCC rules.

Wireless Sensor Network Formation

WSNs may be configured in a wide variety of ways to address emerging markets in sensor networks. In the following sections, we describe more fully network formation in a WSN 100, including network initialization and network creation. We focus here on AFA systems; changes that may be required for FH systems are also discussed. In the following discussion, we describe certain illustrative embodiments; however, these descriptions are purely illustrative and are not intended to be limiting.

Initializing the Network

In order for a WSN 100 to be initialized, the following steps may be performed:
- Appoint WSN Coordinators to perform functions such as network administration, security management, address allocation, data logging, and other functions. In a simple configuration, a single device such as a WSN Gateway 3 will perform these functions. In alternative configurations, these functions may be performed in a distributed fashion by a collection of devices.
- Select parameters for the network, such as AFA or FH Sequences for the Coordinators, interval and dither for the beacons, control channels, channels to be included in the network's operation, and Network ID.
- Place the WSN Coordinator(s) into service.

Once these steps have been completed, the next step in building a network may be for the Host 4 to initiate a "Session." Sessions may be numbered starting at 1, increasing to 255, and then starting over again. The Session Number may be included in every Frame Beacon 401. If a node sees a new Session Number, it may need to rejoin the network.

The Host 4 may have several choices when initiating a network:
- Session Number. The Host 4 may need to keep track of Session Numbers. One way may be to increment the Session Numbers from one Session to another, with checks at the Host level to ensure that two networks with the same Session Number are not operating at the same time. The Session Number may be combined with a unique Network ID that identifies the WSN 100 to distinguish it from other WSNs 100 operating in the same vicinity.
- Multiple Gateways. The Host 4 may support two or more Gateways 3 per Session. These multiple Gateways 3 may be capable of operating independently from each other, thus providing redundancy.
- Node 16-bit ID. Each node in a WSN 100 may be assigned a unique 16-bit network ID. A 16-bit ID may be sufficient to identify and address messages to a Router 2. A 16-bit ID may uniquely identify a Star node 1 in the network; however, in addition to the Star node's ID, the ID of its parent Router 2 may also be needed to address messages to the Star node 1, as described subsequently. The Host 4 may allocate IDs, and IDs may be locked to the Session Number. Doing this may make it easier for a Node to rejoin the network if needed. For example, if a Router 2 loses connectivity to the network but then regains it, the Router 2 can report that it was previously Router X in session Y in network Z. If the Network ID (Z) and Session Number (Y) match, the Router 2 may be able to rejoin the network with Router ID X, because IDs may be assigned once per session (if they are locked to the Session Number and the Network ID).
- FH Sequence (in FH systems). If the Host 4 is reconfiguring an existing network, it may keep the same FH Sequence. If multiple networks are operating in the same facility, it may be best to use different FH Sequences across the various networks. It would make things easier if we could use the same FH Sequence for all networks and coordinate their timings so that they never interfere with one another. However, FCC rules require that the various FH networks operate independently, not in a coordinated fashion. Thus, there may be a need to define a set of FH Sequences that are more or less "orthogonal" to each other, meaning that if they happen to line up in time, they will not collide with each other in a repetitive way. The FH Sequences may also be designed to include only large hops (in support of frequency diversity).
- Once the Host 4 initiates a Session, Gateways 3 may begin to cycle through the control channels (or, in an FH system, the selected FH Sequence), transmitting a Beacon on each frequency.

Creating the Network

After at least one Gateway 3 is in place, the network creation process may begin. The network may inherently build a tree-like network structure branching out from each Gateway 3. Each Router 2 may be capable of checking for new additions to the network.

Acquiring the System's Time Base

Devices in a WSN 100 may have a shared synchronized time base, and channel use may be scheduled based on that shared time base.

When a Router 2 or Star node 1 first awakens, it may need to acquire the time base of the system. To enable this, Routers 2 that have already joined the network may transmit Frame Beacons 401, as described earlier. Until some other nodes detect a Frame Beacon 401 from a Router 2 and attempt to join the network (as a child of that Router 2), the primary functions of a Router 2 may be to transmit these Frame Beacons 401 as advertisements that a WSN 100 is available and to allow other devices to evaluate their connectivity to that Router 2.

A node that wishes to join the network may listen to one of the control channels (or, in an FH system, a selected channel of the 50 available channels). Eventually, a Frame Beacon 401 (or FH Beacon 451) may be transmitted on the channel to which the node is listening; this will allow the node to acquire the time base of the system.

If no Frame Beacon 401 (or FH Beacon 451) is detected, the node may be in a radio null. To attempt again to acquire the system's time base, the node may select a different channel and listen again. If the node tries to acquire a Beacon on several different channels and fails, the node may back off for a time and then retry those channels. If the node still cannot acquire a Beacon, the node may back off for a longer time before retrying. The backoff time between retries maybe changed, e.g., increase, between each set of retries.

If the system is in the middle of a data transmission (from Node to Host 4 or vice versa) during the scheduled Beacon transmit time, the Router 2 may wait to send the Beacon until after the data has been transmitted and acknowledged.

Once a node acquires the time base of the system, the node may keep accurate track of the time, even if the node is asleep, so that all nodes know when to wake up, when to transmit, when Frame Beacons 401 are expected to be transmitted, etc. Each node may be synchronized to its parents; thus, the system time may remain roughly synchronized all the way up to the Host 4.

Joining the Network

Once a node detects a Frame Beacon 401 from at least one Router 2, it may be able to communicate with the network at least through that Router 2. The node may wait on the same channel until it hears from all nearby Routers 2 in the network. If the node is locked to a particular network, it may ignore Frame Beacons 401 from Routers 2 that are not in the node's designated network by checking for a designated Network ID. This may allow several networks to operate nearby without nodes trying to join any and all available networks. The default setting may be to join the first network from which the node detects a Beacon. However, if a node that was previously joined to a network is trying to rejoin a network, it may attempt to rejoin the network to which it was previously joined.

The procedure to join the network may include security checks, such as for authentication. Security features are described subsequently.

Once a node has associated with the network, it may acquire its parent Routers 2. In joining the network, nodes may need to detect Beacons from multiple Routers 2 in order to perform connectivity assessments and choose parent Routers. In one embodiment of an FH system, a newly joined node may listen for an FH Beacon 451 on the previous channel (since, once it acquires the network, it may now know that an FH Beacon 451 will be transmitted on the previous channel).

In one embodiment, each device may start as a generic node, that is, no distinction may be made between Routers 2 and Star nodes 1 when they first join the network. Once a node has joined the network, different operations may be performed on or by the node based on the device type (Router 2 or Star node 1). If the node is a Star node 1, then it may report its feature set and begin its work (for example, collecting and reporting sensor data if it is a sensor-attached Star node 1). If the node is a Router 2, it may report its Router configuration to its parents and begin to transmit Beacons.

Security Features

To prevent spoofing and other security breaches, it may be desirable to add some form of security to the WSN 100. There are a number of features that can be added to introduce security, including authentication and authorization of devices as they attempt to join the network and encryption of messages as they pass within the network.

A number of established schemes exist for authentication, authorization, and encryption. Each method has its own benefits and drawbacks, some of which are discussed below.

Application Scenario

If only authenticated devices are allowed to join the network, then a subscription service may be established in which only subscribers that have paid a fee can access the security keys needed to authenticate devices and communicate within the network.

Certain features may be required in a mesh network security scheme for various application scenarios including:
- Limiting use of the mesh network to devices that are known to a Trust Center (i.e., the device or service entrusted with security functions).
- Restrictions that make it impossible to build counterfeit devices.
- Support for authorization over the Internet.
- Low-overhead encryption for WSN messaging.

Symmetric Key Encryption

Symmetric key encryption may be used to authenticate network devices and encrypt network communications. The symmetric key may be a 128-bit key implemented by the Node's hardware. The 802.15.4 specification allows for AES 128-bit key encryption. Some transceiver implementations, such as the Chipcon CC2420, support encryption in hardware, and such devices handle 128-bit symmetric keys without additional hardware or processor overhead.

To improve security, the security scheme may use multiple symmetric keys. A network-general key may be used for encrypted communication between authorized devices within the network. In addition to the network-general symmetric key, a symmetric key may exist for each Node. This Node-specific symmetric key may be known only to that Node and to the Trust Center. The Trust Center may maintain a database (which may itself be encrypted for security) containing the Node-specific symmetric key for each Node that has been pre-authorized to join the network. Each Node may have its own symmetric key, used both for encryption and decryption.

In order to improve security further, the network-general symmetric key may be changed periodically (such as once per hour), in case an unauthorized device manages to obtain the key. One way to do this may be for the Trust Center to change the key at a scheduled time without notifying any devices on the network. This may result in a new network session being established, which may in turn require all devices to drop out and rejoin the network. This method is straightforward, but rebuilding the network may be undesirable (for example, due to battery power needed for rebuilding, in addition to the interruption in network traffic).

Another way may be for the Trust Center to send a message to each Node using that Node's Node-specific symmetric key. This message may contain the time of the next key change and the new network-general symmetric key that will be in use at that time. The Trust Center may be responsible for receiving acknowledgments from each Node. This method may result in increased network traffic for a period of time prior to each key change, but has the benefit that it is unlikely to require the rebuilding of the entire network. Should a device not receive the notification of the key change, that individual device may drop out of the network (when the new key comes into effect) and may need to rejoin the network.

Messages between a parent Router 2 and a Child node may be encrypted with the parent's symmetric key without creating excessive storage requirements in the Child nodes. The parent's keys may be sent to the children from a Trust Center that knows both the child's and the parent's symmetric key, using the child's key to encrypt a message carrying the parent's key. The parent's key may also be altered periodically by the Trust Center using the old network key plus a node-specific key to encrypt a message that delivers a new key.

Public Key Encryption

Public key encryption systems (also known as asymmetric key encryption systems) use different keys for encryption and decryption. Public key encryption offers a way to authenticate devices and encrypt messages within a WSN 100.

The authentication procedure may be shortened somewhat if the Trust Center maintains a secure database containing the public keys for all pre-authorized Nodes. The authentication process may also be shortened if the authentication is not reciprocal (i.e., the Node does not authenticate the Trust Center).

In addition, if a Node's public keys are somehow mapped to the Node's serial number, this may provide another authentication method. If a message appears to come from a Node with a certain serial number, but the message cannot be decrypted with the public decryption key matching that serial number, then the message must not have been encrypted with the private encryption key matching that public decryption key. Thus, the message may have been spoofed.

Once a Node has been authenticated and allowed to join the network, the same keys may be used for encrypted communication with other devices in the network, as long as the devices share their public keys with each other.

Freshness

Freshness may be provided by sequentially numbering messages from Nodes. Devices receiving messages may remember the sequence number of the last received message from a Node. If the sequence number is not increasing, new messages may be suspect. The cost of the sequence number may include the power required to transmit the additional information, plus the memory in the receiving device to track sequence numbers from all devices in communication.

A Hybrid Authentication/Encryption Scheme

Public key encryption schemes may be highly secure, but may have the drawback that encrypted communication can occur only after public keys have been shared between devices. This may generate additional traffic, complexity, and memory requirements in the Nodes (to store the keys of their neighbors). Asymmetric keys may also complicate network setup and debugging and may add latencies to communications for encryption schemes that are not supported in hardware. Thus, there are advantages in using asymmetric keys to set up the network, but then using symmetric keys for network communications once the devices are authorized. This sort of hybrid security scheme is relatively common; well-known hybrid systems include HTTPS/SSL (Internet) and PGP (email). For example, for authentication, public key encryption may be used, but for general network communication, symmetric key encryption may be used. For certain messages to and from the Trust Center (and designated only for that Node, but not for other devices), public key encryption may be used.

Figure 10:
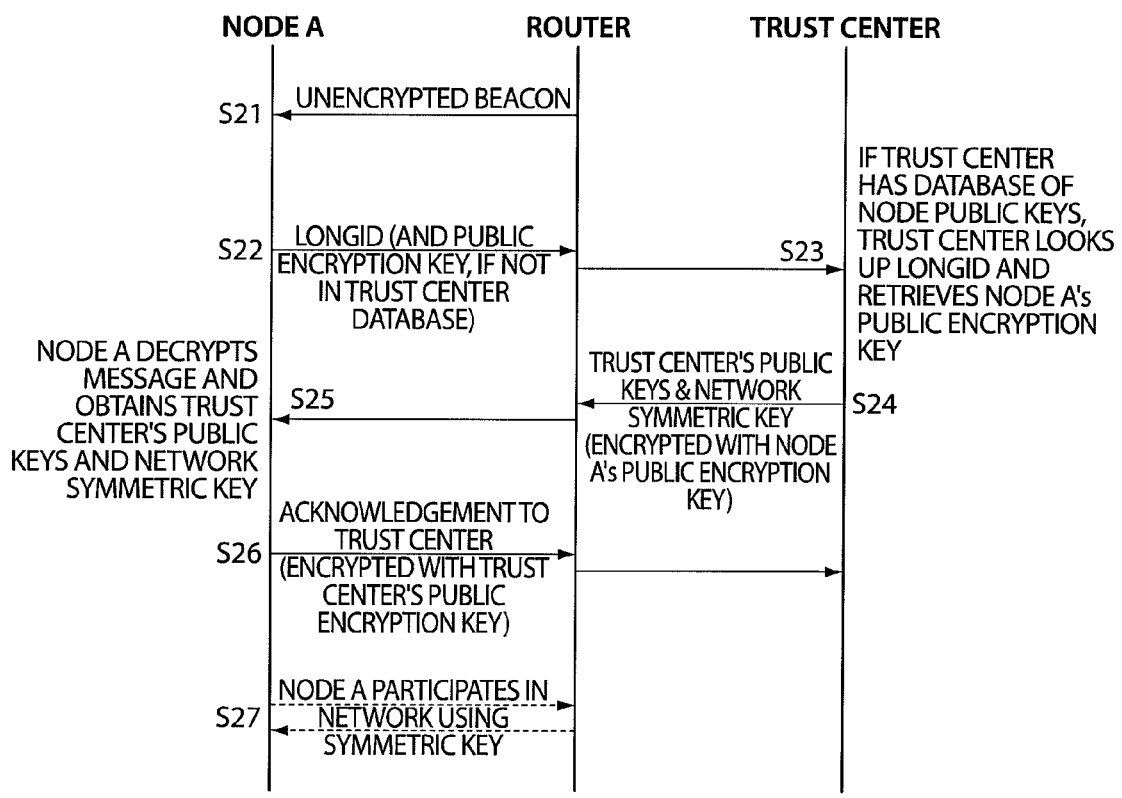
FIG. 10 illustrates a hybrid authentication/encryption scheme in a WSN.

The basic idea of a hybrid authentication/encryption scheme is depicted in FIG. 10. In the example in FIG. 10, Node A may receive an unencrypted beacon from a Router (S21). Node A may send its LongID and its public keys, if needed, to the Trust Center via a Router (S22). If the Trust Center maintains a public key database, it may look up Node A's LongID and retrieve Node A's public encryption key (S23). The Trust Center may send to Node A the Trust Center's public keys and the network symmetric key, encrypted with Node A's public encryption key (S24). When Node A receives the message, Node A may decrypt the message, thus obtaining the Trust Center's public keys and the network symmetric key (S25). Node A may send an acknowledgement to the Trust Center via a Router, encrypted with the Trust Center's public encryption key (S26). Node A may then participate in the WSN, sending and receiving messages using the network symmetric key (S27).

The network's symmetric key may be changed periodically to improve security.

If the Trust Center does not maintain a secure database containing the public keys for all pre-authorized Nodes, Node A may need to send its public keys (S22), since the Trust Center may not yet have these keys.

To verify that a Node attempting to join the network is a user-specific node, as well as to make it more difficult to spoof Nodes or messages in the network, each Node may incorporate a user-specific encryption key. When a Node joins the network, it may encrypt or sign messages using this user-specific private key. The matching user-specific public decryption key may be published and used to verify that the Node is indeed a user-specific Node. Additional signatures may be created for other vendors of Nodes as needed.

If private keys are physically stored in the Node, they may be read from the Node and thus may be discovered. Specialized processor components are available that purport to solve this problem by storing the code in encrypted form and by hiding the decryption key in special hardware that cannot be read.

Security may also be improved if the user-specific decryption key is not published. The message signature may instead be passed to a network or Internet trust center for verification. Verification may be performed on a secure server, and a second key may be used to sign the response. The public half of the second key may be published so that networked devices may see that a Node has been verified.

To prevent another type of spoofing, a random number may also be included in the payload of the message. As this number is decrypted, read, and sent back, this may provide an additional check against a Node pretending that it is another Node or the Trust Center. Additional security may be achieved by injecting a second random number.

Connectivity Assessments in an AFA System

As discussed above, one aspect of the invention involves the use of connectivity assessments by nodes to determine communication relationships within a WSN 100. In one embodiment, a node attempting to join a WSN 100 may listen on designated control channels for Frame Beacons 401. As noted earlier, Frame Beacons 401 may include scheduling information for future Frame Beacons 401 so that nodes can predict the availability of a given Router 2. Once a node hears Frame Beacons 401 from multiple Routers 2, the node may perform a connectivity assessment to each such Router 2. Such assessments may be performed in different ways as discussed below and used by the node and/or the Gateway(s) 3 to select the node's parents and/or preferred communication channels.

To determine a quality measure of a received signal, each packet may be delivered from the IEEE 802.15.4 PHY (or equivalent) with a Signal Quality Indicator (SQI), incorporating factors such as received signal strength, pseudonoise correlation, and other signal quality metrics that may be built into the radio.

Quick (One-Way) Assessment

A Quick Assessment may provide a simplified assessment of the link quality to all nearby Routers 2. It may be used to determine which Routers 2 are the best candidates for Detailed Assessment. Quick Assessment may also be used for Nodes that are mobile.

Quick Assessment may be accomplished by running a receiver (such as a Star node 1) for a period covering a variety of channels. During these periods, a Node may collect statistics on the number and quality of Frame Beacons 401 received from all Routers 2 in range.

Two statistics may be accumulated for each Router 2: Beacon_Count, which is the number of Frame Beacons 401 received, and SQI_Sum, which is an indicator of link quality. These may then be combined in two steps:
1. Convert SQI_Sum to SQI_Average, and then use a table or function to convert SQI_Average to an SQI_Factor in the range of 0 to 1.
2. Use Equation 2 to estimate the probability of reception.
3.

$$\text{Probability} = \frac{\text{Beacon\_Count}}{\text{Beacons\_Expected}} \times \text{SQI\_Factor} \quad (2)$$

SQI_Factor is not necessarily a linear function, and may not significantly affect the result unless link quality is low enough to be correlated with experience of marginal connectivity.

The probabilities may be expressed as percentages, essentially floating point numbers between 0 and 1. They may alternatively be recast to integer form scaled to the range of 0 to 255. One-byte probabilities may then be multiplied together and the high-order byte used as the resultant probability.

For power savings, the sampling may be done in two phases. In the first phase, the Node may first sample one or more channels to get a general idea of which Routers 2 look promising. In the second phase, the Node may collect detailed data from only those Routers 2 that looked promising in the first phase. Power may be saved in the second phase by forecasting the pseudorandom times and frequencies when Frame Beacons 401 will be transmitted and running the microprocessor and receiver only at those times and frequencies.

Detailed (Round Trip) Assessment

A Quick Assessment may be based on one-way connectivity from a Router 2 to a Node. A more accurate result may be obtained by performing a Detailed Assessment based on two-way connectivity. This may cover the common case where connectivity in one direction is acceptable, but connectivity in the reverse direction is problematic.

For a Detailed Assessment, the Node may pick a few candidate Routers 2 based on the Quick Assessment. It may then conduct a two-way test by sending a packet to each of the candidate Routers 2 and seeing whether an ACK comes back in response. Scoring may be done as in the Quick Assessment.

SQI measurements described above may be from Router 2 to Node. A two-way SQI measure may be more accurate and/or provide useful information, and this can be handled be including the Node-to-Router SQI in the Router-to-Node acknowledgement packet.

Round-trip connectivity is likely to be somewhat worse than one-way connectivity. Thus, a Quick Assessment may normally give higher probabilities than the corresponding Detailed Assessment. For this reason, it may be best not to make decisions based on comparing Quick and Detailed Assessments.

On command from a Router 2 or a Gateway 3, the Node may report its Connectivity Assessment. A given report may include an indicator of how the Assessment was calculated (Quick or Detailed), along with the number of samples used to create the Assessment.

Selecting Parents Using SQI

Connectivity Assessment may not be a practical option for devices that have very little memory, or for devices that are mobile and need to make quick routing decisions. Such devices may select parents on a permanent or temporary basis using SQI alone.

In one embodiment, a newly joined node may listen for a specified amount of time to each Router 2 that it has selected as a candidate for its parent Routers 2. Once the node has gathered SQI information for several Routers 2, such as five Routers 2, the node may sort the nodes by SQI. It may then send a request to the Router 2 with the best SQI, asking that Router 2 to become its primary parent. If its request is denied, the node may continue down the list until it establishes a primary parent. If the node gets to the bottom of the SQI list without establishing a primary parent, the node may scan again for new candidates to become its parent Routers 2, performing SQI assessments, ranking Routers 2 by SQI, and sending requests for a primary parent until the node's primary parent is established.

Once the node's primary parent has been established, the node may go through the list of ranked Routers 2 again in a similar fashion, this time excluding its primary parent from the list, to establish its secondary parent. Although possible, the same Router is typically not used as both primary and secondary parent, as this would be redundant.

The node may be able to function without a secondary parent if no suitable secondary parent is found; however, a primary parent may be required for communication with the network. If no suitable primary parent is found after numerous retries, the node may back out of the network. It may then re-associate with the same network or attempt to join a different network.

In one embodiment of the system, a node without a secondary parent may be able to join the network, but the node may continue to seek a secondary parent on a regular basis until suitable candidates are found and a secondary parent is established. This may also address the issue of Routers 2 that join the network early on, when few other Routers 2 are available to become parents; as Routers 2 are added to the network, Routers 2 that have not yet selected secondary parents may continue to search until they have located secondary parents.

Once a Router 2 has accepted a node as its child, the Router 2 may send a packet to the Gateway 3 indicating its responsibility for the child node (as primary or secondary). A parent Router 2 may give negative acknowledgment to nodes that incorrectly think they are children of that Router 2.

Connectivity Assessments in an FH System

The concepts of Connectivity Assessment are similar in a FH implementation, but with some differences in detail.

In an FH implementation, the Frequency Hopping schedule may be shared by all Routers 2 that hop together in a WSN 100. Each Router 2 may attempt to transmit an FH Beacon 451 at a pseudorandom time during each frequency hop.

A probabilistic approach may be used to assess the connection between a node and its nearby Routers 2. For example, suppose a node expects to receive 50 packets from a Router 2 over a given period, on each of the available 50 channels. If it receives 48 of those packets, it has measured 48/50=96% connectivity. This probability may be discounted if measured signal quality is low, reflecting a link that might be particularly sensitive to changing conditions.

For a valid connectivity assessment, a variety of frequencies spread across the band may be sampled.

Quick Assessment may be accomplished by running a receiver (such as a Star node 1) for a period covering a variety of hop channels, with reasonable ranges including 6 to 50 hops. During these periods, a Node may collect statistics on the number and quality of FH Beacons 451 received from all Routers 2 in range.

Sampling fewer than 50 channels may save power. For example, ten channels may be sampled for a Quick Assessment; this may likely a result that is almost as accurate.

For power savings, the sampling may be done in two phases. In the first phase, the Node may first sample a handful of channels to get a general idea of which Routers2 look promising. In the second phase, the Node may collect detailed data from only those Routers 2 that looked promising in the first phase. Power may be saved in the second phase by forecasting the pseudorandom times when FH Beacons 451 will be transmitted and running the receiver only at those times.

For Detailed (round trip) Assessment, the most accurate result may be achieved by testing all 50 channels, but for power savings, it may be more practical to use a sampling approach on (for example) 10 or 25 channels.

Ongoing Assessment and Time Synchronization

The Child node's parent Routers 2 may acknowledge heartbeats, as described subsequently. This provides a "free" way to test connectivity continuously.

Heartbeats may be scored in batches of, say, 25, using the same metrics as the Detailed Assessment. Heartbeat success rate may be reasonably consistent with the original Assessment when the connection was established. If this is not the case, the Child node may report that fact to the Host 4 and wait for further instructions.

Relative clocks between nodes and their parents may drift over time. If clock crystals are accurate within 20 ppm, this means a clock may drift 0.02 milliseconds per second. Two crystals drifting in opposite directions may drift as much as 0.04 milliseconds per second in relation to each other. Each minute, these drifts may add up to 2-3 milliseconds. If a parent-child connection is lost for a few minutes, these kinds of errors may add up quickly.

A Router 2 that monitors the channel continuously may resynchronize its clock to its parent every time it receives a Beacon from another Router 2. Thus, Routers 2 may keep to a tight schedule in relation to each other.

For nodes that are children of one or more Routers 2, it may be best to resynchronize with each Router 2 every minute or two. Various techniques may be used. Some options may include:

Turn on the receiver until a Beacon is received.

Figure 11:
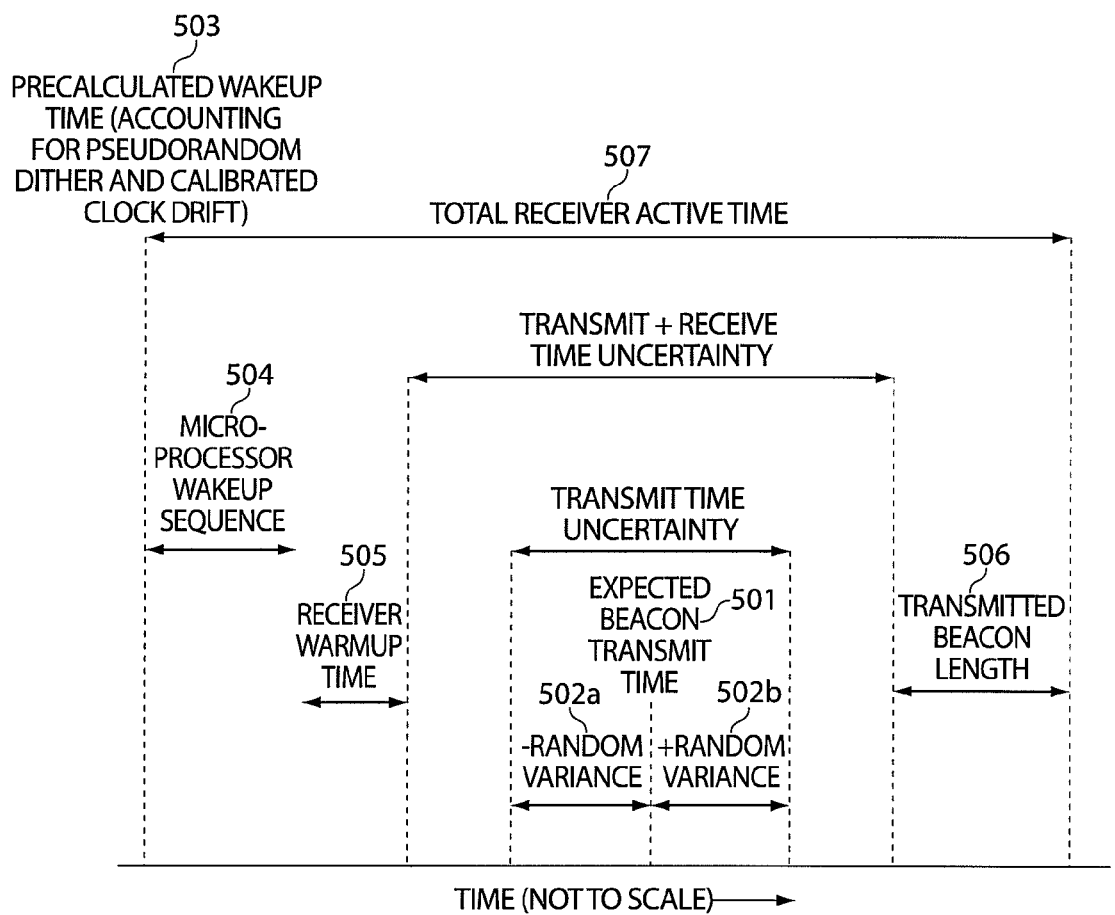
FIG. 11 shows the uncertainty that may be accounted for by a node in forecasting Beacon timing.

Forecast the timing of Beacons by duplicating a Router's pseudorandom timing of these Beacons. Listen for a Beacon at an expected time, leaving some extra time before the Beacon to account for expected clock drift since the prior time synchronization, as illustrated in FIG. 11. A child node may predict expected Beacon transmit time 501 by knowing the schedule for its parent, accounting for a pseudorandom dither as described previously. However, because there is some uncertainty in the relative clocks of a node as compared to its parent, there is some uncertainty in the actual transmit time and receive time (shown as Random Variance 502 in FIG. 11), so the child node may need to wake up 503 early enough to account for this uncertainty. In addition, the child node may need to allow time for its microprocessor to wake up 504, its radio receiver to warm up 505, as well as time to calculate the dither (or find the appropriate entry in a dither lookup table, as described earlier), and additional time may be allowed for calibrated clock drift and Beacon transmission length 506. Thus, the child node may need to remain awake and listening for a Beacon for a period of time 507 before and after the expected Beacon transmit time. The sequence may be as follows:

Child calculates wakeup time, accounting for all of the expected latencies.

Child goes to sleep for a period of time.

Child wakes up at precalculated wakeup time 503.

Turn on the microprocessor 504, conduct any processing that is needed on wakeup (such as reading a sensor).

Warm up the radio 505.

Start listening at some time during the period prior to when the parent is expected to transmit its beacon.

Under some circumstances it may be useful for a node to request a Beacon explicitly from a Router 2 or Gateway 3. For example, a heartbeat packet may optionally request a Beacon following its acknowledgement. This approach may be more power efficient in an FH system for a Star node 1 that is generating heartbeats anyway.

It may be best for a node to maintain a separate time base with respect to each of its parents. For example, a Router 2 might maintain three independent time bases: one with respect to its primary parent, a second with respect to its secondary parent, and a third with respect to its children.

Microprocessor clock accuracy is typically specified as a range, such as ±20 ppm. In practice, the crystals driving the clocks may have more precision. For example, one part may be plus 8 ppm, while another part may be minus 17 ppm. Thus, in some hardware implementations it may be useful for a node to calibrate its clock drift relative to each of its parents by measuring the clock drift between pairs of time synchronization points. Accuracy may change over time due to aging effects, so it is best to recalibrate the drift periodically. Clock drift may also change with environmental factors, such as temperature changes in both the child and parent nodes. Such secondary effects may be separately calibrated out of the system, for example by explicitly measuring the node's temperature, or tolerated in less optimized implementations as something that reduces the intrinsic precision of the node's timer.

Routers Form a Backbone

Routers 2 in range of a Gateway 3 may detect Beacons with a new Session Number. After confirming that this is not a communication error (such as a spurious reception from a nearby network), these Routers 2 may stop transmitting Beacons from previous sessions, if any, and may stop performing any functions related to previous sessions. This lack of responsiveness may percolate through the node's descendants and may cause the overall network (if one already exists) to timeout.

In an FH system, a Router 2 may detect FH Beacons 451 with a new Session Number if the FH Sequence remains the same. If the FH Sequence is different, the Router 2 may stop hearing FH Beacons 451 from its parents at all and its parents may become unresponsive. In that case, the Router 2 may follow the power-up procedure to discover the FH Sequence and so forth.

When a Router 2 observes Beacons with new Session Numbers, it may verify that it is not picking up stray packets from a different network by confirming that Beacons from its parents have entirely disappeared and that its parents are unresponsive in general. (Even if its parents are awake, they may be operating with a new Session Number and/or new Network ID and may thus no longer be identifiable as the Router's original parent.) Once the Router 2 has ascertained that the new Beacons are indeed replacements for the old, it may begin a connectivity assessment.

Each Router 2 may include a table in the following form:

| Quick Assessment | Joining Delay |
| --- | --- |
| x > 90% | 0 sec |
| x > 75% | 60 sec |
| x > 60% | 120 sec |
| x > 50% | 180 sec |
| Otherwise | Keep waiting |

When a Router 2 sees a Beacon for a new session, it may conduct a Quick Assessment to determine if it should join the network. (This may not apply to Gateways 3.) According to the table above, if it sees at least 90% connectivity to another Router 2 (or directly to a Gateway 3), it may join immediately. If not, it may continue with a Quick Assessment for another 60 seconds to see if it finds improved connectivity, presumably due to other Routers 2 joining the network. If, at the end of 60 seconds, it has at least 75% connectivity to another Router 2 (or to a Gateway 3), then it may join the network. This assessment may continue down the table. If the Router 2 has not yet joined the network, and new Router(s) 2 appear with higher quality than previously observed, the delay may be reset and the process restarted.

Figure 12:
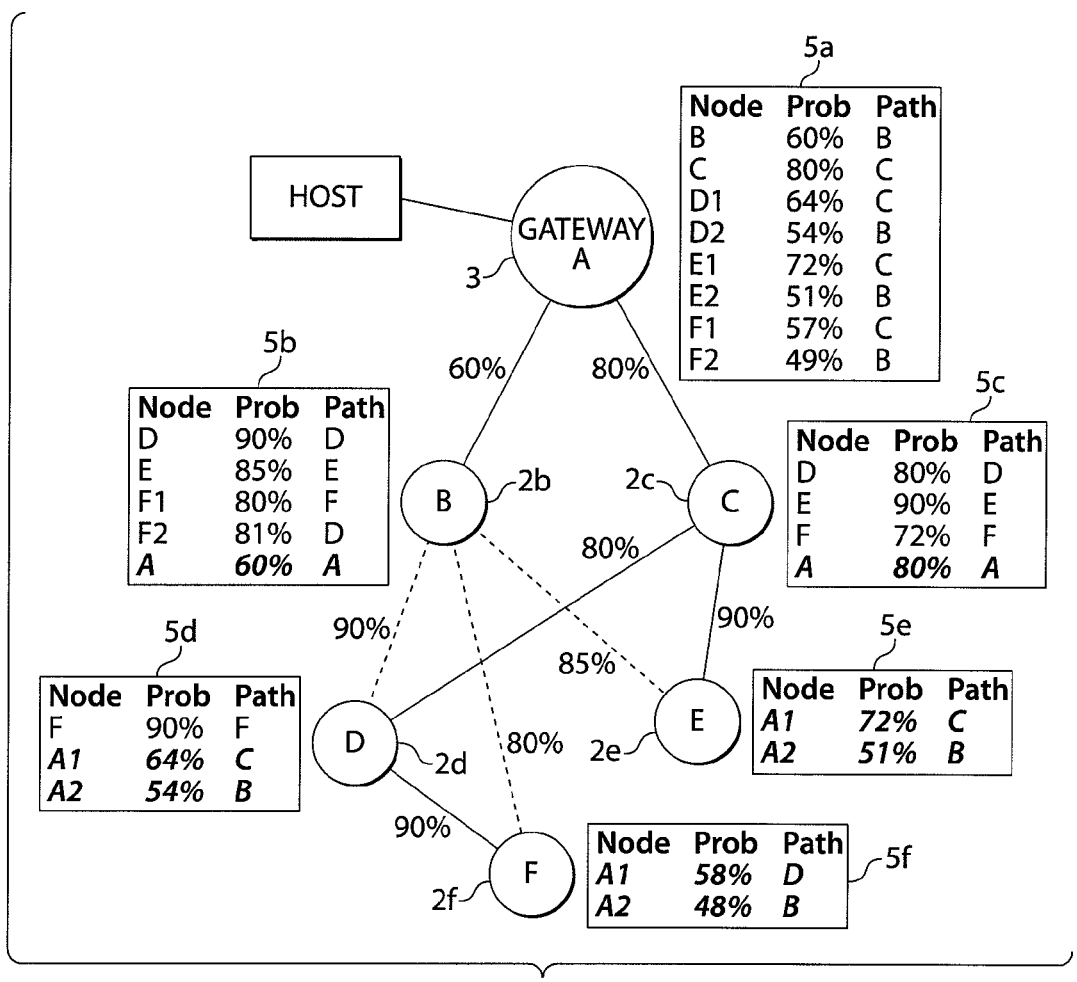
FIG. 12 illustrates the chaining of Connectivity Assessments and the use of routing tables with probabilities.

A probabilistic approach allows connectivity assessments to be chained, as shown in the example in FIG. 12. In FIG. 12, the probabilities shown are Connectivity Assessments indicating the probability that a packet sent by a device will reach another device. Thus, for example, if Router 2b (B) sends a number of packets to Gateway 3 (A), A is likely to receive 60% of the sent packets, while A is likely to receive 80% of the sent packets from Router 2c (C). Likewise, if Router 2d (D) sends a number of packets, Router 2b (B) is likely to receive 90% of them. In a connectivity assessment, these probabilities can be multiplied to estimate the likelihood that a packet sent by one device will reach any other device in the network. For example, the probability that a packet sent by Router 2e (E) will reach the Host 4 is 90%*80%=72% if the path E-C-A-Host is used and 85%*60%=51% if the path E-B-A-Host is used. The tables 5 in FIG. 12 list the probabilities for all relevant paths from each device, including paths through the parents to the Gateway 3 A and paths to the node's descendant Routers 2. Note that these probabilities may reflect the chance that a single packet will reach its destination without retries. Actual performance may be better than calculated with retries on different frequencies and attempts to transmit on secondary paths.

In this case, it is interesting that the path D-C-A (64%) is a better connection choice than the path D-B-A (54%), even though the quality of the connection D-B (90%) is better than the quality of the connection D-C (80%). That is because the downstream connection to the Gateway 3 is much better from C than from B. Thus, it may be preferable to select parents based on the total quality of the connection to the Gateway 3, not just the connection quality of the closest hop.

Once the Quick Assessment indicates that the Router should join the network, the Router 2 may execute a Detailed Assessment to select an appropriate primary and secondary parent. (This selection may be based on connectivity to the Gateway 3, as shown in FIG. 12. However, we may establish an additional condition such that a Router 2 may not attach to another Router 2 unless the Quick Assessment passes the test above.) Then the Router 2 may request a 16-bit Router ID from the Host 4. The Host 4 may be responsible for allocating unique 16-bit Router IDs, such as by starting at 1 and incrementing from there. When Router IDs need to be recycled, all networks connected to a Host 4 may be re-initiated, with new Session Numbers (and, in the case of FH systems, different hop sequences).

With each Router 2 having a primary and secondary parent, there may be a clear path back from every Router 2 to the Host 4, with each Router 2 simply passing messages upward to one of its parent nodes until messages reach the Gateway 3 and then the Host 4. The path in the other direction, i.e., from the Host 4 to each Router 2, may use an additional scheme that is shown diagrammatically in FIG. 12.

In FIG. 12, tables 5 in the boxes provide routing from the Host 4 to outlying Routers 2 (and from each Router 2 to the Host 4 via the Gateway 3 A). Routing from the Routers 2 to the Host 4 is indicated by primary (solid) and secondary (dotted) lines. Note that Gateway 3 (A) may calculate the entire tree by building on the routing tables found in its two children Routers 2b (B) and 2c (C). Also, note that Router 2b (B) gave priority to a direct connection to Router 2f (F), even though its probability is lower than an indirect connection. A direct connection may be preferable because it is possible for Router 2b (B) to directly validate that Router 2f (F) received the message.

This scheme outlined in FIG. 12 has two basic purposes.

1. It provides a way to route messages from a Gateway 3 to its Routers 2.
2. It provides a way to route messages between Routers 2. For example, to send a message from Router 2f (F) to Router 2e (E), the message may be sent from Router 2f (F) toward the Gateway 3 until it reaches Router 2b (B). Since there is an established path from Router 2b (B) to Router 2e (E), the message may then be directed to Router 2e (E) without involving the Gateway 3 or the Host 4.

Another way of determining the routing may be to assign static weights to each path segment between the Gateway 3 and a node. For example, a weight of 1 may be assigned to each primary relationship and a weight of 100 may be assigned to each secondary relationship. For each path between the Gateway 3 and a node, therefore, the weights of each path segment may be summed up to provide a total path weight. For example, in FIG. 12, the path A-C-D-F would have a weight of 1+1+1=3, while the path A-B-F would have a weight of 1+100=101. The path with the lowest total weight may be selected as the preferred route from the Gateway 3 to that node and stored in a routing table. Each Router 2 may maintain a routing table for all of its subordinate nodes. As new Routers 2 are added to the network, path weights may be rechecked to ensure that the best path (i.e., the path with the lowest total weight) is always used as the preferred route to the and from the Gateway 3.

Nodes Connect to Router Backbone

Once a Router 2 backbone is in place, nodes may connect to Routers 2. The nodes may join the network using a procedure similar to that described earlier for Routers 2, including retry and backoff procedures and association requests. This may occur in the following steps:

3. Acquire the time base of potential parents, or verify that it has not changed by reading at least one Beacon.
4. Perform a Quick Connectivity Assessment to identify candidates for primary and secondary connection.
5. Perform a Detailed Connectivity Assessment to select primary and secondary connection. Connectivity Assessments may be compared by considering the link quality to immediate prospective parents, optionally also considering the prospective parents' link quality to one or more Gateways 3.
6. Use 802.15.4 MAC to attach to selected Routers 2. This may result in a two-part address for Star nodes 1—16 bits to indicate its parent Router 2 and another 16 bits to indicate the address of the Star node 1 within the Router's sphere of influence. In one embodiment, each Router 2 may have its own sphere of influence. Each Star node 1 may be in two spheres of influence, a primary and a secondary.
7. Inform the Host 4 that the node has joined the network, including the Connectivity Assessment results and other application-specific information.

This entire process may be completed without ever sending a message to the Host 4, although there are cases in which the Host 4 may need to get involved in setting up a connection. For example, a Router 2 may not have the memory or bandwidth to support additional connections. In this circumstance, the Router 2 may report the situation to the Host 4 application and may await further instructions. Similarly, it may be the responsibility of the Host 4 application to detect opportunities for load balancing and instruct Routers 2 and Star nodes 1 to reconfigure accordingly. Additionally, the Host 4 may act a security Trust Center to allow the node to join the network.

The node may select its primary and secondary Routers 2 based on assessments as described above and may connect to those Routers 2 using techniques that are supported by the 802.15.4 MAC. A minimum threshold may be used to decide whether it is worth using power to connect to a particular Router 2. If there is some connectivity but no Router 2 is suitable, the node may persistently attempt (within reason) to report this fact to the Host 4.

As long as a node can hear from at least one Router 2, the node may send a request to join the network. For an optimal connection, the node may process packets from all Routers 2 within radio range so that the node may perform a Detailed Assessment.

When a node first joins the network, it may be desirable to redo the Quick Connectivity Assessment a few minutes later. This may cover the case where the node joins the network while the Router 2 backbone is being built. In this case, substantially better connections to the Host 4 may be available a few minutes later.

A node may also conduct a Quick Connectivity Assessment periodically, such as every 30 minutes, to look for large changes in connectivity.

A node may periodically issue heartbeats to validate connectivity to its primary and secondary parents. If connectivity degrades substantially, the node may redo the Connectivity Assessments to validate that no better links are available.

Building Routing Tables

Once Child nodes have been added to the network, routing tables may be built. These routing tables may contain information about primary and secondary parents for each device in the network, as well as data on routes to and from each device. This may allow packets to be rerouted if necessary and the network to be reconfigured or rebuilt if conditions change (such as significant changes in SQI readings), if network topology changes (such as a Router 2 dropping out), or if network connectivity is lost. Routing tables may be built as described earlier, using weighting of path segments from Gateways 3 to the node.

When a Child node joins the network, it may pass information about its primary and secondary paths, including path weights, to its parent Routers 2. The parent Routers 2 in turn may store this information and add their primary and secondary path weights to the information and pass it up to their parent Routers 2. This may continue until the information reaches the Host 4, providing information to build routing tables at each Router 2 for all of its subordinate devices.

Each device may know its best path to the Host (using the earlier connectivity assessments). This information may be used to prevent circular routing. Devices can be instructed to reject paths that contain themselves to prevent loops (i.e., devices may include instructions not to become children of their own children). For example, if Router 2(B) tries to become the child of Router 2(D), but Router D's path to the Host 4 includes Router 2(B), Router 2(D) can reject Router 2(B)'s request (because this would create a path from D that goes to B and then from B to D itself).

Routing tables may include addressing information that may contain a short ID address for each Router 2. Star node 1 addresses may be in two parts. The first part may refer to the address of a Star node's parent Router 2, and the second part may refer to a short address for the Star node 1 used by its parent Router 2. For example, Star node 1(C) that is a child of its primary parent Router 2(A) may be referred to as A, C. With two-part addresses of this form, routing tables in the WSN 100 need not refer to star nodes; the address of the parent router is sufficient. Substantial memory and table maintenance can be saved in this fashion. The two-part address may be stored on the Gateway 3 or Host 4 and requested by Node and Host 4 applications as needed.

Wireless Sensor Network Operations and Communications

In the following sections, we discuss basic network operations and communication in a WSN 100. We focus here on AFA systems; variations that may be appropriate for FH systems are also discussed. In the following discussion, we describe certain illustrative embodiments; however, these descriptions are purely illustrative and are not intended to be limiting.

IEEE 802.15.4 radios are specified in three types: 250 kbps operating in the 2400-2483 MHz band, 40 kbps operating in the 902-926 MHz band, and 20 kbps operating in the 868 MHz band. In the future, a 250 kbps variant at ~900 MHz and other variants may also be specified.

When frequency hopping is used, in one embodiment using Chipcon CC1000 transceivers, the system may operate at 38.4 kbaud. However, the radio may be capable of operating at 19.2 kbaud or 76.8 kbaud, and in another embodiment these rates may be enabled with a software upgrade.

In one embodiment, frequency hopping may be handled in OSI level 2. When the network or application needs to send a packet, it may initiate the request without regard to the position in the hop pattern, thus resulting in a system that does not favor one frequency over another over time. One exception to this may be that layers above OSI level 2 may wait for the next hop during the backoff-and-retry procedure. If a message is sent by a node but no acknowledgment is received, the system may wait for a CAP 402 on another channel and may resend the message.

Star nodes 1 may operate on a low duty cycle to conserve battery power, transmitting heartbeats (described subsequently) to their parent Routers 2 at intervals such as once per minute. Most of the time, Star nodes 1 may be "asleep." When they awaken, if they have messages to transmit, the Star nodes 1 may initiate communication, transmitting messages to their parent Routers 2 to be propagated toward the Host 4.

Routers 2 may not normally propagate heartbeats or transmit "node present" messages when a heartbeat is heard. Instead, in order to limit bandwidth consumption, Routers 2 may propagate messages toward the Host 4 by exception when a child's heartbeat is not heard.

As a network grows, particularly when it is a network with frequent communication (such as a large network of nodes that frequently report temperature and humidity data), the amount of traffic to the Gateway 3 and Host 4 naturally may increase. The amount of traffic may nonetheless remain small, since the data packets from a given node may be relatively small (tens of bytes) and/or infrequent.

Packet Formats

Figure 13:
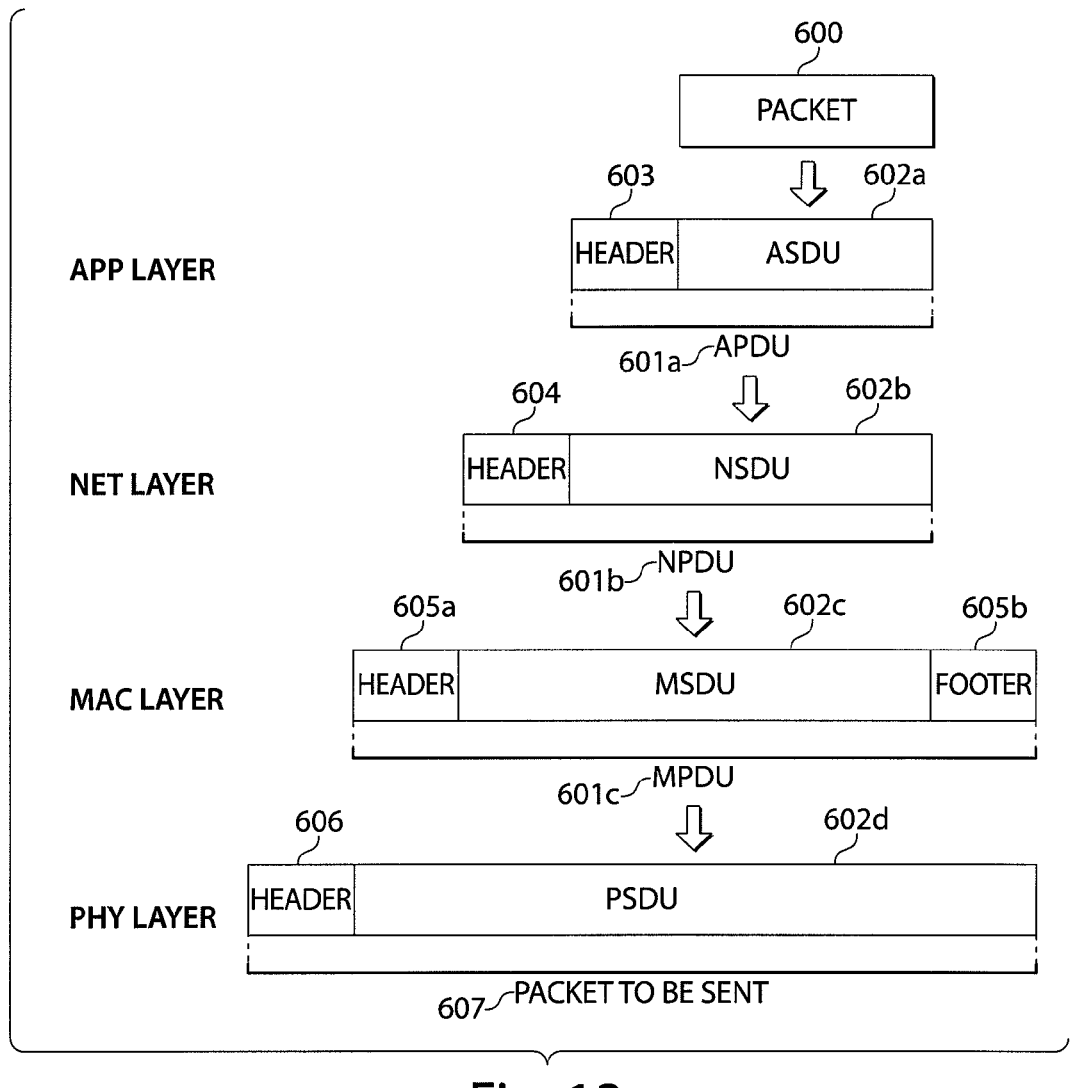
FIG. 13 shows an embodiment of packet structure in a WSN.

In a WSN 100 there may be four protocol layers: APP, NET, MAC, and PHY. As shown in FIG. 13, for each packet 600 that is sent, each layer may encapsulate the layer above, adding a header and, in some cases, a footer. The header, packet payload, and footer (if any) for a layer together may constitute the Protocol Data Unit (PDU) 601 for that layer. The PDU 601 may then be passed to the next layer, where it may become the Service Data Unit (SDU) 602 for that next layer. For example, as shown in FIG. 13, the MAC Protocol Data Unit (MPDU) 601c may become the PHY Service Data Unit (PSDU) 602d.

As shown in FIG. 13, the APP layer may add a simple header 603 that may include information about packet length and packet type to any packet 600 that is sent. The NET layer may add its header 604 to the packet sent down by the APP layer. The MAC layer may add a header 605a and footer 605b to the NET layer packet, and the PHY layer may add a header 606 to the MAC layer packet. The actual packet that is transmitted may be the PHY packet 607.

When the packet 607 is received, each layer may remove its header (and footer, if any) and (if necessary) may pass the packet up to the next highest layer. This type of operation is typical for layered protocols.

802.15.4 does not address the format of packets in the APP and NET layers; thus, a WSN 100 may use its own format. The WSN 100 MAC header 605a may be 802.15.4 compliant.

The WSN 100 PHY header 606 may differ from the 802.15.4 PHY header if an alternative radio or frequency hopping is used.

Heartbeats

Each child node may occasionally send a heartbeat to each of its parents. A parent may respond with an acknowledgement. This acknowledgement may include:

- An indication of a Store-and-Forward message (such as a Host 4 or application-level acknowledgement) queued for the child node. In this case, the child may execute the procedure, defined in the 802.15.4 MAC, to download the queued store-and-forward message.
- If so requested within the heartbeat message, Beacon information to enable the child to resynchronize to its parent's time base.

The information above may not be part of the 802.15.4 acknowledgement packet. Implementers may define a non-compliant acknowledgement packet to include efficiently the information above.

All heartbeats may be acknowledged. Lack of an acknowledgement may indicate to the child node that the heartbeat was not received by its parent and should be retried.

If a node loses contact with its parent for many consecutive minutes, the relative clocks of the child and parent may drift apart, and thus synchronization may be lost. To retain time synchronization, a periodic parent/child interaction is needed. A heartbeat may not be the most power-efficient way for a node to retain time synchronization with its parent. For example, the child may forecast the timing of the parent's Beacon and may listen to the channel exactly when the Beacon is expected. Listening for a Beacon once per minute or so may require (very roughly) that the receiver run for about 7 milliseconds per minute, at a power cost of about 5 µJ/ms*7 ms/min*1440 min/day*365 days/year=1.5E8 µJ/year. This is about 1.5% of the capacity of a pair of AAA batteries, i.e., not a significant power issue. Using a heartbeat solely for the purpose of time synchronization, with a power-consumptive transmission added to the mix, may consume on the order of 5-10 times more power (depending on the details of the parent-child interaction). For this reason, it may not be desirable to use a heartbeat for time synchronization unless the application has a separate requirement for frequent heartbeats.

On the other hand, if a child node has an application requirement for frequent heartbeats with acknowledgements, time synchronization may come more or less for free by adding the time base to such acknowledgement packets.

Some channels may have consistently better connectivity than others. If local regulations permit, it may be a desirable optimization to time heartbeats and other periodic parent-child interactions to coincide with hops that utilize such channels. Depending on implementation details, local regulations may require unbiased use of all available channels; a configuration option may be provided to cover such situations.

When a node is first registered as a Router's child, the Router 2 may command the child to send a heartbeat to the Router 2 periodically, with a default interval defined by the Router 2. The Router-defined heartbeat rate may typically be relatively slow, such as every 15 minutes. The primary purpose for this Router-requested heartbeat may be to confirm that the child is still alive so that Router resources to service that child may remain on reserve. If the Router 2 does not receive a heartbeat from the child during this default period, it may inform the Host 4 of this fact. Additionally, the Router 2 may drop a non-reporting child from its list of children (informing the Host 4 of this action) if limited resources so require.

Likewise, such a heartbeat may periodically confirm to the Host 4 application that a node is still operating. The Host 4 application may infer the node's good health by a lack of exception reports from the node's primary parent.

For some applications, the node may add an additional heartbeat as required by the application. Some examples include:

Actuators. Heartbeats may be used to poll a node's parent for pending store-and-forward messages. Actuation commands may be one important type of message. Actuators may need to communicate with the parent frequently enough to meet the application's performance goals. For example, if the user requires a sprinkler head to respond within 5 seconds, sprinkler-head Star nodes 1 may utilize a 2-3 second heartbeat to poll for such commands. Alternatively, if the actuator is powered, the Star node's radio receiver may run continuously (or for the duration of the parent's CAP 402). Actuation messages may then be sent immediately to the Star node 1 when received by its parent.

Security applications. Nodes used for security applications may periodically send heartbeat messages as indicators that the node is still working and no one has tampered with it.

If an application requires a frequent heartbeat, it may do so through its primary parent. For example, there may be a one-minute heartbeat to a node's primary parent and a fifteen-minute heartbeat to a node's secondary parent. A timeout of the one-minute heartbeat to the primary parent may indicate an alarm condition that is interesting to the user and may be reported by the network as such. A timeout of the fifteen-minute heartbeat to the secondary parent indicates only the health of the link.

As noted above, either the parent or the child may set the child's heartbeat rate. In either case, a missing heartbeat may be reported to the Host 4 by exception.

A child node may attempt to ensure that its parent receives each heartbeat on time. A few seconds before its parent is expecting a heartbeat, the child may initiate the following sequence:

8. The child may send a heartbeat packet addressed to its primary parent. If all goes well, the packet is acknowledged and the child may go back to sleep.
9. If the heartbeat is not acknowledged, the child may retry the heartbeat on other available frequencies (such as one try per channel in an AFA or FH system). If possible, the child may allow a few seconds to elapse so that temporary situations (such as moving objects getting in the way) may resolve themselves.
10. If the heartbeat is still not acknowledged, the child may try to send an "I'm alive" message to the Host 4. The normal approach may attempt to utilize the primary and secondary parents, so if either link is operational, this should work.
11. Having done its best to send a heartbeat, the child may go back to sleep and may try to send the heartbeat again at the next interval. If the previous heartbeat failed and the heartbeat interval is long, the child may shorten the interval and/or retry several times during the interval.
12. The child's application may include logic to search periodically for a new network in the event that connectivity is lost.

If a parent receives a heartbeat after it reports that the heartbeat was missed, it may immediately report to the Host 4 that the child has re-appeared.

If a parent receives any message at all from a child during a period, it may assume that the child is still alive and not report an exception to the Host 4.

Routers 2 may also generate heartbeats directed to their parents and may operate similarly to the child node operation described above.

Store-and-Forward Messages

As noted above, heartbeats may be used to trigger the transmission of store-and-forward messages from a parent to its child.

The store-and-forward option may not always be used. Messages between Routers 2 may be transmitted without a trigger if a downstream Router 2 is expected to be awake, such as during a CAP 402. Similarly, if a Star node 1 is powered and generally awake, messages may be sent to such Star nodes 1 without waiting for a heartbeat or poll.

Due to the possibility that a node may receive its message from either its primary or secondary parent, each parent may maintain one or more packet buffers for each child for which the parent is responsible. This buffer may contain the most recent packet destined for each child. The next packet destined for that child may overwrite the currently occupied memory. This method may allow a child to receive the data from either of its parents, and the acknowledgement mechanism may handle the single-threaded nature of the buffer.

Each packet may have a marker of its importance that may indicate necessary data (high priority data) vs. disposable data (data that is less important to reach the child node). If a new message arrives for a child, but the parent is still holding a packet in the buffer for that child, the parent may look at the importance marker for the held packet. If the held packet contains disposable data, the parent may overwrite the held packet with the new packet. However, if the held packet contains necessary data, the parent may reply to the sender that it is still holding a necessary packet for that child. If the child has already received that necessary packet via an alternate route and has sent an acknowledgement to the Host 4, the Host 4 may send an override command to the parent telling it to overwrite the held packet with the new packet. In another embodiment, a parent may maintain a hash table to hold messages for forwarding.

In another mode or embodiment, the parent may indicate in its Frame Beacon 401 that certain children need to pick up store-and-forward messages. If such Beacons are precisely timed, a child node may monitor the channel at exactly those times without a substantial power impact. This approach may also limit the amount of radio traffic that might otherwise be generated by children polling for messages. If a large number of children have pending messages, a flag in the Frame Beacon 401 may indicate that each node or certain groups of nodes need to poll the parent for messages.

A parent may also keep a table of its child nodes. The table may include:

the short ID for each child
the child's relationship to the parent (e.g., whether the Router 2 is a primary or secondary parent to that child)

whether there are any pending store-and-forward messages for the child other information, such as when the child was last heard from and heartbeat rate If a child has not been heard from recently (i.e., it has sent neither heartbeats nor messages for a certain length of time), its primary parent may send a "lost node" message to the Host 4. If the Host 4 is aware that the node has rejoined the network with new parents, the node's original parents may be instructed by the Host 4 to drop all pending messages for that node. If the node is entirely lost, it may simply be dropped from the network.

If a Router 2 is lost, all nodes below that Router 2 may also be lost. Thus, the Host 4 may instruct the Router's parent nodes to drop all messages with the lost Router 2 in their destination path.

Sending Messages from a Child Node to a Host

When a Child node has a message to send to a Host 4, a flag in the message may indicate that a particular Host 4 is the destination. Delivery to the Host 4 may not be guaranteed. The Child node may request a Host acknowledgement as confirmation that the message was actually received.

Figure 14:
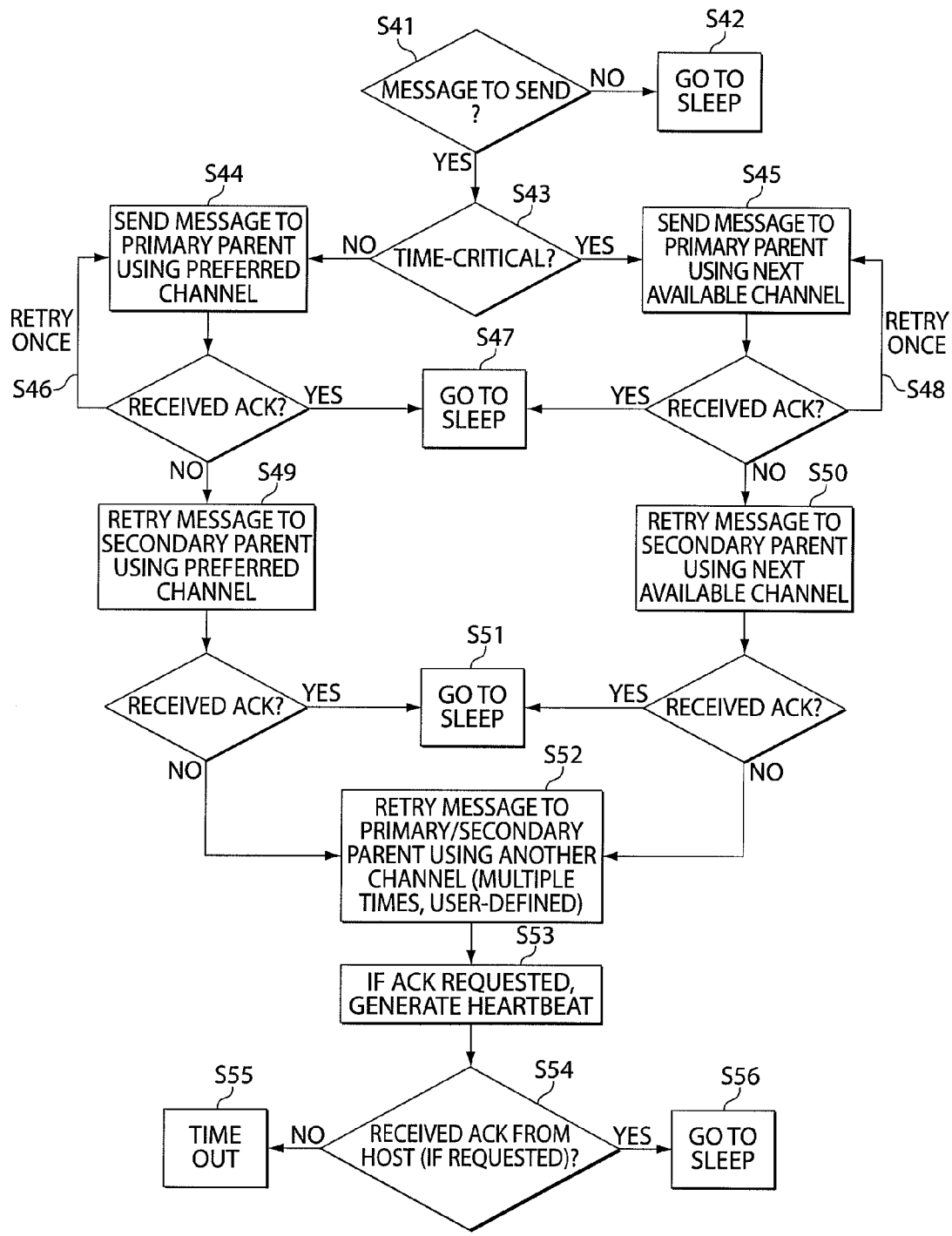
FIG. 14 illustrates a send/retry strategy for messages from a node to the Host in a WSN.

An illustrative send/retry strategy is illustrated in FIG. 14. As shown in FIG. 14, when the Child node sends a message, the Child node may go through the following steps:

1. Determine whether there is a message to send (S41). If not, go to sleep (S42).
2. Determine whether the message is urgent (time-critical) (S43).
3. Attempt to send the message to the Child node's primary parent (S44/S45). If the primary parent acknowledges receipt of this message, the Child node may skip to Step 7.
   3a. If the message is urgent, send the message using the next available channel (S45).
   3b. If the message is not urgent, send the message using the preferred channel (S44). As noted earlier, the preferred channel may be selected by testing the quality of available connections or by using the most recent channel that worked.
4. If the time slot has not terminated, retransmit the message to the primary Router 2 (S46/S48). This may allow an inadvertent collision or other transient connectivity problem to resolve itself. If the primary Router 2 acknowledges the packet, proceed to step 7.
   4a. If the message is urgent, send the message using the next available channel (S48).
   4b. If the message is not urgent, send the message using the preferred channel (S46).
5. Attempt to send the message to the Child node's secondary parent Router 2 (S49/S50). If the secondary Router 2 acknowledges receipt of this message, the Child node may skip to Step 7.
   5a. If the message is urgent, send the message using the next available channel (S50).
   5b. If the message is not urgent, send the message using the preferred channel (S49).
6. Try sending to primary/secondary Router 2 on another available channel (S52). (In an FH system, wait until the network hops to a frequency that is separated from the frequency used in Steps 1a & 1b by at least 5 MHz. It is preferable to design hopping sequences so that all hops exceed 5 MHz.)
7. Repeat Steps 1-6 (S41-S52) a number of times that is defined by the application. Two or three tries may be reasonable for most applications.
8. If a node requests an acknowledgement from the Host 4, the node may generate a heartbeat at an application-defined rate for an application-defined amount of time (S53). In an application in which messages are supposed to be received by the Host 4 within 5 seconds, for example, it may be reasonable to generate a heartbeat every 2 seconds (± a randomized factor) for 10 seconds before timing out. This heartbeat may be addressed to the node's primary or secondary parent, depending on which parent gave a positive acknowledgement in earlier steps. The heartbeat (as described above) may allow the node to receive a store-and-forward acknowledgement from the Host 4.
9. If a Host acknowledgement was requested by the application, the network layer may ultimately call back with either a Host acknowledgement (in which case the node may go to sleep (S56)) or a timeout (S55).

Routers 2 may also have primary and secondary parents and may use essentially the same procedure as above to forward messages from Router 2 to Router 2 back towards the Host 4. Each node may attempt to forward a message to its own primary (or secondary, if necessary) parent, which may in turn forward the message to its primary (or secondary, if necessary) parent, and so on, until the message reaches the Host 4.

The originating Child nodes may classify messages as low priority or high priority. High priority messages may be forwarded to the Host 4 as quickly as possible. In contrast, Routers 2 may combine low-priority messages into fewer but larger consolidated packets to reduce network traffic. (In high traffic scenarios, consolidated packets may be used on high priority messages as well, with the intent of reducing the average latency of high priority messages.)

A Router 2 sending messages to a Host 4 on its own behalf may act as a Child node in that context.

Sending Messages from the Host to a Star Node, and from One Star Node to Another Messages from the Host 4 to a Star node 1 may have a two-part address: a 16-bit Router ID and the Star node's ID. Normally, a message may be addressed to the Star node's primary Router 2, with three exceptions:

13. The Host 4 is responding to a message or command that was sent through the Star node's secondary Router 2;
14. Connectivity to the primary Router 2 is poor.
15. The message is addressed to a Router 2, not a Star node 1.

Messages may be sent from Host 4 to Star node 1 in essentially the same way as messages are sent in the other direction, with routing as illustrated in FIG. 12. Messages from Star node 1 to Star node 1 may also be supported as illustrated in FIG. 12.

In one embodiment, messages from one node to another may not need to pass through the Host 4. Once routing tables have been built, Routers 2 may have established routes for all Routers 2 below them (i.e., their children, and their children's children, etc.) Thus, a message from one node to another may be sent upward to a common ancestor. Once the message reaches a common ancestor, the common ancestor may recognize that the message is intended for one of its subordinate nodes. The common ancestor can then forward the message to one of its children, where the message can be forwarded as needed to the intended recipient. An example is shown in FIG. 15.

Figure 15:
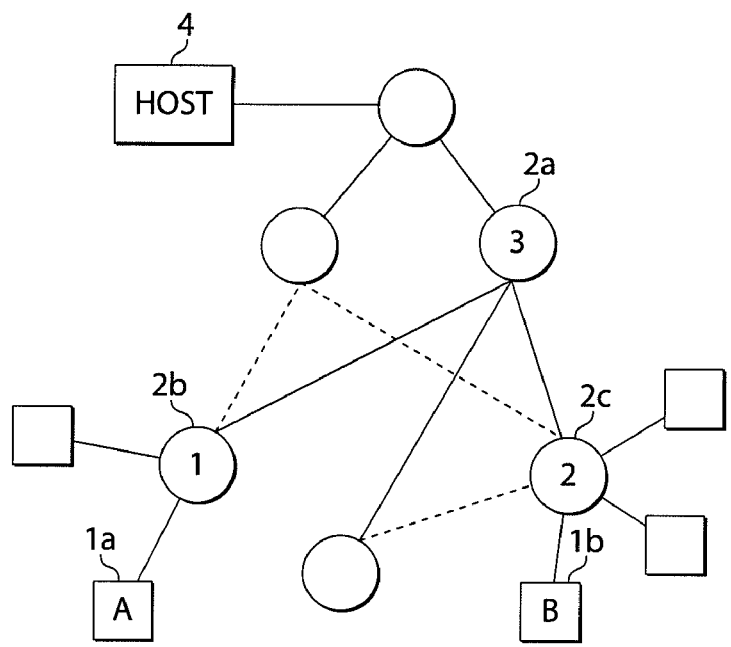
FIG. 15 illustrates a method for message forwarding without involving the Host.

In FIG. 15, Star node 1*a* (A) wants to send a message to Star node 1*b* (B). A sends the message, addressed to 2,B, to its primary parent Router 2*b* (1). Router 2*b* (1) does not know 2,B, so it forwards the message to its primary parent Router 2*a* (3). Router 2*a* (3) knows Router 2*c* (2), so it sends the message down to Router 2*c* (2), and Router 2*c* (2) forwards the message to 2,B (when Star node 1*b* (B) is awake).

If no node along the forwarding path knows a route for the designated recipient node, the message may be forwarded all the way to the Host 4.

Addresses may be established for additional devices. For example, a datalogger may be established at an address, and packets sent to that address may be logged by the datalogger.

Broadcast Functionality; Reprogramming the Nodes

Large messages several kilobytes long may occasionally need to be simultaneously broadcast to a large number of nodes. An application of this kind may be wireless reprogramming of the nodes.

A Router 2 wishing to broadcast a long message may break the message into small sections, such as 64 bytes long. Each section may be numbered, thus enabling the recipient to assemble the message even if it is received out of order. The Router 2 may then fix a schedule to broadcast one section every a±b seconds. One option is to broadcast the one or several consecutive fragments just before the normally scheduled times for the Frame Beacons 401, which would have the effect of shortening the maximum length of the prior CAP 402 by a corresponding number of milliseconds. In response to heartbeats from its child nodes and/or in Frame Beacons 401, a parent node may announce that a transmission with a given sequence number is in process. The fragmented message may be transmitted some number of times, with fragments transmitted in a preset order, as requested by the Host 4. For a software download, three transmissions may be an appropriate number.

A node may learn about message broadcasts in a heartbeat acknowledgement and/or in Frame Beacons 401. The node may then issue a query to the Router 2 to learn more about the message, such as message number and transmission schedule. The node may then use one of the following techniques to decide whether the message is directed at the node:

The node application may query the Host 4 regarding whether the numbered transmission is of interest and, if so, what to do with it.

The message may be directed at a group number. If the node has the same group number, it may process the message as per cached instructions provided by the Router 2.

The message may be directed at a range of firmware version numbers. If the node's firmware is in that range, the message may be treated as a firmware update.

The node may assemble the message by synchronizing itself with the Router's message transmission schedule and placing the numbered sections into a buffer. Since sections may be transmitted in order, the node may know when given sections will be transmitted. As sections are filled in, the node may not need to waste power reading those sections again.

The node may listen to its primary and secondary Routers 2 simultaneously to receive the message more quickly and reliably.

When the Routers 2 are done transmitting the message, some nodes may have sections that are missing. A special transaction may allow a node to request transmission of specific sections to fill in the blanks.

Each packet that is sent across the communications link may be CRC checked according to the ITU-CRC-16 methodology. According to Computer Networks (Andrew S. Tanenbaum, 2002, Pearson Education), the accuracy of this check is at or near 100% for various types of errors, including single bit and double bit errors (100%), odd-numbered errors (100%), and burst errors (100% when shorter than 16 bits; 99.9969% when exactly 17 bits, 99.9984% for other burst errors). The error detection efficiency of CRC-16 may virtually eliminate errors, as it is considered nearly flawless for packets less than 4 Kb. As an additional check furfer to ensure reliability, a CRC may be calculated for each block of 1024 bytes that is transmitted for the purpose of code upgrade.

The bit error rate of the radio may make it more efficient to send relatively long message segments with forward error correction.

Each node may confirm to the Host 4 when its software download is complete. At this point, the Host 4 may issue a packet to the node to tell it to reboot and to utilize the new code.

Despite the best efforts of the data transmission code, the image may be corrupted. This problem may be solved by the utilization of a small bootstrapper, which may be loaded into the device to serve two purposes: to reduce the active code space utilized during the download process, and to allow the device to reset to the bootstrapper in the event that the code that was downloaded is corrupted or unable to execute.

The bootstrapper may be capable of running the radio for the purpose of downloading code and of managing the images to assure that they run properly.

Network Topology Changes

In the following sections, we discuss changes in topology in a WSN 100. We focus here on AFA systems; modifications that may be required for FH systems are also discussed. In the following discussion, we describe certain illustrative embodiments; however, these descriptions are purely illustrative and are not intended to be limiting.

In the normal course of network processing, a device may lose contact with its primary or secondary Router 2, or other conditions may occur that require changes to be made to an existing network. Four general cases in which changes to an existing network may be required are described below.

Star Node Loses Connectivity to Parent Router

First, there is the case of a Star node 1 that is experiencing problems with connectivity to its primary or secondary Router 2. In this case, the Star node 1 may need to search for a new set of parents.

To conserve power and bandwidth, a Star node 1 may not search for a new secondary parent if its secondary parent is lost but its primary parent remains accessible. Also, if a primary parent is lost but a secondary parent remains viable, a Star node 1 may not immediately seek a new primary parent. The amount of time for which a Star node 1 may function with only a secondary parent and no primary parent may be configurable. An exception to this procedure may be if a parent is lost but the Star node 1 had a packet addressed to that parent (as opposed to a packet that is simply being routed through that parent). In this case, the Star node 1 may seek new parent Routers 2.

One way for the Star node 1 to reacquire the network may be for the Star node 1 to wait on a channel until it sees a Beacon from at least one Router 2. The Star node 1 may request that the Router 2 ping the Star node 1 on each frequency for a full Sequence cycle, so that connectivity may be assessed. Although the Star node 1 may request a ping on each frequency (i.e., "Ping me." <next frequency> "Ping me." <next frequency> "Ping me." and so forth), this may create unnecessary network traffic. Instead, the Star node 1 may request the pings all at once, i.e., "Ping me once per frequency for a full cycle."

In another embodiment, rather than pinging only that Star node 1, the Router 2 that is being considered may broadcast a message on each frequency for a full cycle of hops. This may allow all Star nodes 1 that are evaluating that Router 2 to use the same message, rather than each Star node 1 requesting and receiving separate pings. This may be useful if multiple Star nodes 1 have lost contact with their parents.

When ping data has been received and an assessment completed, the Star node 1 may autonomously choose new parents. Alternatively, the Star node 1 may forward connectivity data to the Host 4 and the Host 4 may assign new parents to the Star node 1. The Star node 1 may then notify its new parents of their assignment.

Routers 2 may lack the global information to reconfigure themselves optimally. In contrast, Star nodes 1 may autonomously move from one Router 2 to another without affecting the rest of the network. The primary tradeoff is that it requires battery power to assess connectivity to alternative Routers 2. Since connectivity data may shift as conditions change, but moving to a new Router 2 may require battery power, it may be desirable to set a range within which a Star node 1 will not attempt to switch Routers. For example, a Star node 1 may not attempt to move to a new Router 2 unless the connectivity assessment changes by a certain amount for a certain length of time, which may indicate that the connection to a Router 2 has gotten significantly worse and that this is a lasting condition rather than a momentary anomaly. This may help to reduce power consumption.

Care should be taken in implementation to avoid scenarios where the Star node 1 wastes power and bandwidth flip-flopping between connections of similar quality. This might be avoided by keeping a record of recent changes.

When a Star node 1 changes its connection, it may inform the Host 4 that it has moved from one Router 2 to another.

Although Star nodes 1 can determine which Routers 2 have the best connectivity, it may be better for the network if the Host 4 decides which Star node 1 is associated with which Router 2. For applications where Star nodes 1 are largely stationary, in the typical case Star nodes 1 should not change Routers 2 unless connectivity is lost. If connectivity remains reasonable, a Star node 1 should only change Routers 2 if requested to do so by the Host 4. The Host 4 may maintain additional information that can help load balance the network. It may also allow Star nodes 1 to be associated in a fashion that can indicate their physical proximity.

If connectivity falls below a preset threshold (e.g., probability<0.33), the Star node 1 may inform the Host 4 that it has a problem and go to sleep. It may heartbeat at a low rate in case the system's original configuration is re-established. If many consecutive heartbeats fail (e.g., 20), the Star node 1 may also stop transmitting the heartbeat. Note that if connectivity is lost completely for an extended period, time synchronization may be lost.

In the event that connectivity is lost, a Star node 1 may periodically attempt to rejoin the network, starting with acquiring the system's time base. One way for the Star node 1 to reacquire the network may be for the Star node 1 to wait on a control channel until it sees a Frame Beacon 401 from at least one Router 2. Then the Star node 1 can complete a new connectivity assessment. When the assessment has been completed, the Star node 1 may autonomously choose new parents and preferred communication channels. Alternatively, the Star node 1 may forward connectivity data to the Host 4 and the Host 4 may assign new parents to the Star node 1. The Star node 1 may then notify its new parents of their assignment.

A Star node 1 may periodically receive a command from the Host 4 of the form "reconfigure at a randomly selected time in the next x minutes." If x is zero, the process should proceed immediately.

There may be some applications where a Star node 1 may move periodically or even relatively continuously. If a Star node 1 is expected to be mobile, such as a Star node 1 with a motion detector on an asset, then a connectivity problem combined with detection of motion may be evidence that a Star node 1 may need to seek new parents. This situation, along with other cases, is discussed subsequently.

If a child Star node 1 times out, its parent Routers 2 may drop the Star node 1 and inform the Routers' parents. Eventually, this information may reach the Host 4 and routing tables may be changed accordingly.

Host Decides to Rebuild Network

Second, there is the case in which the Host 4 may periodically decide that the network should be rebuilt. For example, the Host 4 may receive information that indicates numerous connectivity failures in the network. In this case, the Host 4 may discard existing routing tables and may allow all remaining Star nodes 1 and Routers 2 on the network to time out. The Host 4 may increment the session ID by one. The network may then be rebuilt as if it were a new network (as described earlier) using a new session ID. When a new network is built using a new session ID, all activity using the previous session ID may time out.

It may be desirable to reconfigure the network periodically even in the absence of connectivity failures. Connectivity assessments may be conducted continually using heartbeats from Star nodes 1 and Routers 2 (as described earlier in the section concerning system communications), Beacons, or acknowledgements. For example, a Star node 1 may keep track of who it heard from and at what times. This data may be used to calculate the percentage of packets received by that Star node 1 from each Router 2. If dramatic (i.e., above a certain threshold) changes are detected, the Host 4 may choose to allow all Star nodes 1 and Routers 2 to time out, and then the Host 4 may reform the network.

The Host 4 may instead instruct a Star node 1 or Router 2 to reacquire the network. A Star node 1 or Router 2 may receive a command from the Host 4 of the form "reconfigure at a randomly selected time in the next x minutes." If x is zero, the reconfiguration process may proceed immediately.

When a Router 2 reconfigures, all routing tables may be deleted so that old paths containing that Router 2 are not kept in the routing tables.

Router Loses Network Connectivity

Third, there is the case in which a Router 2 is lost vis-à-vis the network. An example is shown in FIG. 16.

Figure 16:
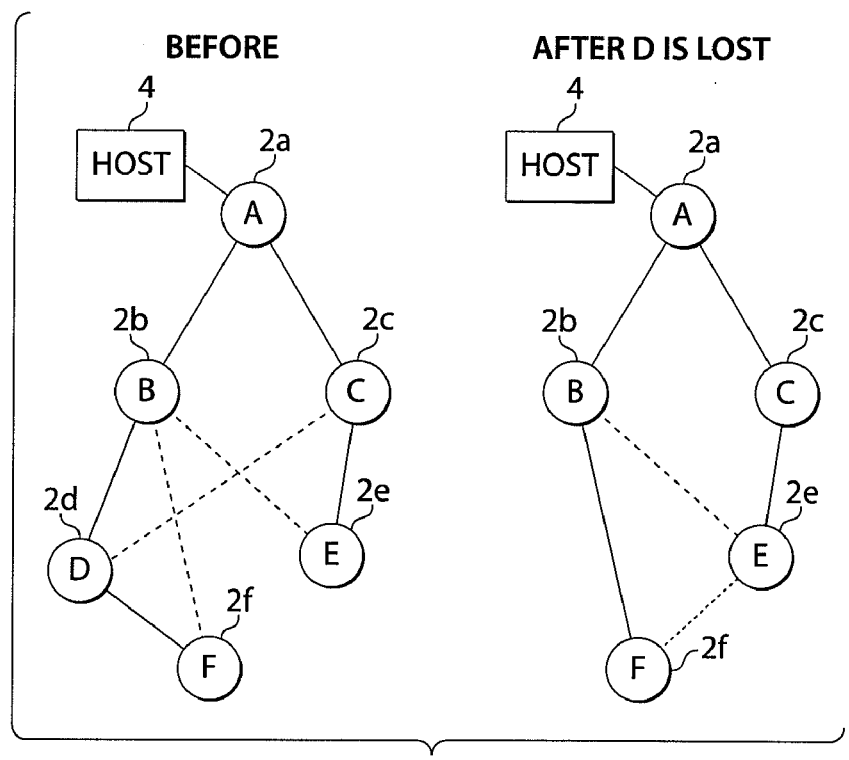
FIG. 16 illustrates how a WSN may be restructured if a Router is lost vis-à-vis the network.

Referring to FIG. 16, if connectivity to Router 2d (D) is lost, then Router 2f (F) might switch to Router 2b (B) as its primary and Router 2e (E) as its secondary. When a Router 2 is lost, all routing tables may be updated so that old paths containing that Router 2 are not kept in the routing tables. If a child Router 2 times out, its parent Routers 2 may drop the child Router 2 and its descendents and may inform the parent Routers' parents. Eventually, this information may reach the Host 4 and routing tables may be changed accordingly.

If 2*f* is not a Router but a Star node 1, then it may seek new parents as described in the first case (of a Star node 1 losing connectivity). However, as noted earlier, Routers 2 may lack the global information to reconfigure themselves without causing problems. In the case shown, even if 2*f* (F) is a Router 2, F does not have any Routers 2 as children, and it can reconfigure itself without danger of creating circular references.

However, if a Router 2 is in the middle of a tree, such as Router 2*b* (B), it might create circular paths if it chooses new parents independently. Such Routers 2 may notify the Host 4 that connectivity has been lost and may await further instructions from the Host 4. The Host 4 may assign new parents to the Router 2 based on connectivity assessments. Routers 2 may also have instructions not to become children of their own dependents to prevent circularity.

When Router 2*f* (F) notices that its primary parent Router 2*d* (D) has been lost, Router 2*f* (F) may notify the Host 4 to drop existing paths utilizing the lost Router 2*d* (D). This notification may contain a session ID or time stamp so that the Host 4 may determine the order in which packets were sent. The Host 4 may then drop existing routing table entries using the lost Router 2*d*. The Host 4 may instruct all Star nodes 1 and Routers 2 that previously were Router 2*d* (D)'s children to perform connectivity assessments for assigning new primary and secondary parents to those children.

Another way to update routing tables when a Router 2 is lost may be for each Router 2 to examine "lost node" messages that are sent upward toward the Host 4 and, if a Router 2 is reported lost, drop all paths containing the lost Router 2. In this case, total path weights may need to be recalculated to determine the new lowest path weight and thus the new preferred route for each of the lost Router's subordinate Routers 2.

If the lost Router 2*d* is still "alive" (though not communicating with the rest of the network), it may dissociate itself from its children. The children may then discover that they can no longer communicate with their parent and thus may need to seek new parents.

If Router 2*d* (D) is later able to reestablish connectivity, it may rejoin the network as a new device. However, it may not rejoin in its original position, as the Host 4 may choose to realign the network based on current connectivity assessments. (Based on connectivity data, however, the Host 4 may indeed choose to place Router 2*d* (D) back into its original position.)

Other Changes in Topology

Fourth, topology changes may be made outside of the constraints covered by the three cases previously described. Topology changes may require that as few Routers 2 as possible update their routing tables. All routing tables that involve the affected part of the network may be recreated. This process may not require that any devices be orphaned. The devices may simply destroy their routing tables and recreate them as described earlier. Most nodes, except for those that have lost a parent, may not even be aware of the changes. When routing tables are changed, a new session ID may be assigned by the Host 4.

Instead of recreating the routing tables, the network may be terminated by changing the Session ID. In an FH system, this may be accompanied by a change to the FH Sequence. If the network is terminated, it may need to reform as described below.

Devices that know the topology has changed may generate new routing information for the new topology and may send this up to the next Router 2 as they would in network formation. Each device that receives a new entry for a device may replace the previous data for that device. There may be no comparison of existing routing information with the new information, because the old routing information may have become invalid.

The routing table may require that an identifier be associated with the routing information to assure that data is not erroneously deleted. When a device changes the information describing a particular path, it may change the identifier associated with the information. Only the paths that are modified may require the updated identifier. This way, a device that receives updated data may discern between updated information and data that need not be modified.

Once a Router 2 joins the network, it may lack a total picture of the network, and, without such knowledge, "localized" changes in the network hierarchy may result in circular paths. As noted earlier, Routers 2 may have instructions not to become children of their dependents to prevent circularity. Alternatively, a reconfiguration scheme may be developed that does not involve the Host 4, for example borrowing from literature on Destination Sequence Distance Vector (DSDV) routing. However, it may be more efficient and give better results to model and define network topology changes on the Host 4.

Routers 2 may need to support the following functions to enable the Host 4 to reconfigure the network:

- Routers 2 may continuously conduct Quick Assessments of connectivity to nearby Routers 2 and may periodically report this to the Host 4. This Quick Assessment may be robust enough to detect when new Routers 2 have joined the network. (If the Router 2 is on a duty cycle, Quick Assessments may instead be done periodically or only on request from the Host 4.)
- The Host 4 may request that a Router 2 report its most recent Quick Assessment data.
- The Host 4 may request that a Router 2 conduct a Detailed Assessment with respect to one or more of its neighbors.
- The Host 4 may request that a Router 2 or Star node 1 change its primary and/or secondary parents and may receive confirmation that this has been accomplished. Such changes may involve routing changes in both directions. It may be the Host's responsibility to serialize such requests across the network so that network integrity is not lost at any step.

Under this design, a new Router 2 may join an existing network, but existing Routers 2 may not be routed through this new Router 2 unless commanded by the Host 4 to do so, or unless the network is rebuilt starting from the Gateway 3.

Addressing Packets in Transmission During Network Reconfiguration

When connectivity is lost for a Star node 1 or Router 2, there may be packets in transmission to or from that Star node 1 or Router 2. However, it may be desirable to ensure that packets are not lost in transmission. How this is addressed may depend on where the packet is when connectivity is lost.

If a packet is being sent from the Host 4 to a Star node 1 via its primary parent, but connectivity to that primary parent is lost while the packet is in transmission, the packet may not reach the Star node 1, and the Star node 1 may not send an application level acknowledgement to the Host 4. The last Router 2 that handled the packet may note the absence of a MAC level acknowledgement and may interpret such an event as a failed transmission. The Router 2 may attempt to resend the packet to the Star node 1 via its secondary parent. If this also fails to result in an acknowledgement, the Router 2 may attempt to resend the packet via another path. If no acknowledgement is received, eventually the Router 2 may notify the Host 4 that connectivity to the Star node 1 may be lost.

If a packet has been sent to a Star node 1, and the Star node 1 has received the packet, the Star node 1 may send an acknowledgement to the Host 4. However, if a Router 2 on the path from the Star node 1 to the Host 4 loses connectivity while the acknowledgement is being sent, the Host 4 may not receive the acknowledgement. (For example, in FIG. 12, if an acknowledgement is being sent from Router 2*f* (F) to the Host 4, and Router 2*b* (B) is lost while the acknowledgment is in transmission, the acknowledgment may not reach the Host 4.) The Host 4 may attempt to resend the original packet and may attempt to send the original packet using a different path or by flooding, until it receives an acknowledgement from the Star node 1 that the packet was received.

If a Star node 1 sends a packet to the Host 4, it may expect an acknowledgement within a certain time, depending on the hop count and typical latencies between the Star node 1 and the Host 4. If no acknowledgement is received within the expected time, the Star node 1 may attempt to resend the packet and may attempt to utilize a different transmission path.

If connectivity is reestablished while packets are being retransmitted, this may result in the same packet being received more than once. This may increase network traffic but may ensure that all packets are received and acknowledged.

Support for Multiple Gateways

The specification thus far has been mostly limited to WSNs with single Gateways 3. For a single Gateway 3 configuration, the system may build a single tree of primary connections feeding back to a common Gateway 3, with secondary connections that may provide backup paths to the same Gateway 3. This paradigm may be generalized to support multiple Gateways 3, as shown in FIG. 2. As shown in FIG. 2, Gateways 3*a* (X), 3*b* (Y), and 3*c* (Z) are connected to a common Ethernet backbone. Routers 2*a*-1 may form connections to those Gateways 3*a-c* as described previously. One important advantage of a multi-Gateway configuration is that the secondary path may lead to a different Gateway 3 than the primary path. For example, in FIG. 2, Router 2*h* (H) has a primary path to Gateway 3*b* Y and a secondary path to Gateway 3*c* (Z). In fact, in the configuration shown in FIG. 2, the failure of any single Gateway 3*a-c* or Router 2*a*-1 may be tolerated. Another advantage of a multi-Gateway 3 configuration is that the number of hops to a Gateway 3 may be reduced when Gateways 3 are interspersed among Routers 2, resulting in a faster and more reliable network.

As drawn, the routing shown in FIG. 2 implies that it does not matter which Gateway 3*a-c* is used for communication with a particular Star node 1*a-t* or Router 2*a*-1. Thus, the one "single point of failure" in this picture is the backbone itself, shown as an Ethernet 50 in FIG. 2. The routing topology may be configured to support a parallel collection of Gateways 3 on separate networks, with routing tables configured to provide every node with connectivity to each Gateway 3. Alternatively, in typical applications redundant backbones may not be necessary. There are various solutions to provide reliable Ethernet and similar backbones with different cost/reliability tradeoffs as appropriate for specific applications. In contrast, individual WSN components are generally based on very inexpensive radios and related components optimized for low cost. It may therefore be reasonable to design a WSN 100 under the assumption that any specific WSN link or device is intrinsically less reliable than the backbone connecting Gateways 3.

The potential configurations with multiple Gateways 3 may grow more complicated as the WSN 100 scales. As a WSN 100 grows to include potentially dozens of Gateways 3, individual Routers 2 may simply not have the network-wide information to derive optimal Router topology. Additionally, the Routers 2 may not necessarily have the processing power to make sophisticated network tradeoffs; in fact, it may be desirable to conduct such processing elsewhere if it will reduce Router processing/storage requirements and thence Router costs. Furthermore, the programming environments in Routers 2 may make it difficult to write complex software to make subtle network-wide topology tradeoffs. With today's microprocessors, a Gateway 3 may plausibly be designed around a $25 processor running Linux, with many megabytes of storage to facilitate network operation. Such Linux-based Gateways 3 may provide a backbone of "network brains" that are relatively easy to program. It thus may make economic and practical sense for network intelligence to be placed in Gateways 3 as WSNs scale.

As the Gateways 3 grow more sophisticated, Routers 2 may be simplified merely to follow configuration commands issued by intelligent Gateways 3. The following set of capabilities represents a minimal set of functions that may be needed by such Routers 2:

- Join the network. Follow the procedure used by Star Nodes (described previously) to join the network.
- Conduct connectivity assessment and report results. Spontaneously and/or in response to Gateway commands, conduct Connectivity Assessment to Routers 2 in range and report results.
- Modify primary and/or secondary parents. In response to a command, change position in the network and confirm the change. The change may be implemented by the node in two steps by first removing itself from its current parent(s) and then adding itself to its new parent(s).
- Convert between Router and Generic node. A Router 2 may need to act temporarily as a Generic node during periods when the network is being formed and reconfigured. For example, a new Router 2 joining the network may first join as a generic device, then have its parents chosen through Gateway commands, and then become a Router 2 (or Star node 1) through another command from the Gateway 3.

With these four baseline commands in place, Gateways 3 have the tools to analyze network connectivity and configure network topology as needed. Simultaneously, Routers 2 may be simplified by letting the Gateways 3 handle subtle routing decisions.

Figure 17:
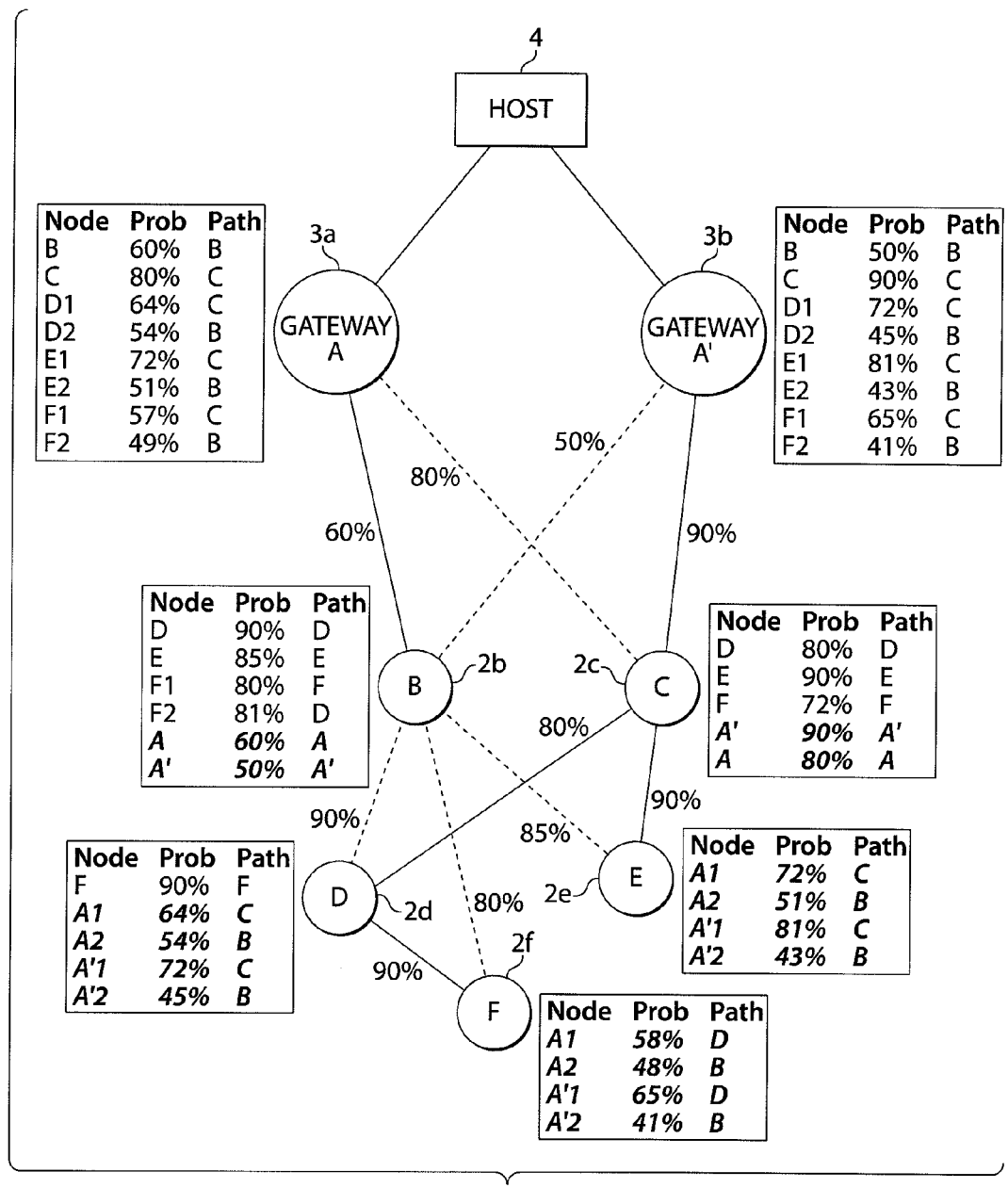
FIG. 17 illustrates the chaining of Connectivity Assessments and the use of routing tables with probabilities in a WSN with more than one Gateway.

As described earlier, connectivity assessments may be chained to estimate the likelihood that a packet sent by one device will reach any other device in the network. FIG. 17 provides an example with Connectivity Assessments in a WSN 100 with two Gateways, 3*a* (A) and 3*b* (A'). For example, the probability that a packet sent by Router 2*f* (F) will reach the Host 4 is 90%*80%*80%=58% if the path F-D-C-A-Host is used and 90%*80%*90%=65% if the path F-D-C-A'-Host is used.

Enhancements to the WSN Architecture

The following sections describe some enhancements that may be used with a WSN architecture.

Supporting Multiple Networks in Range

Although much of our earlier discussion described a system with only one network in range, the WSN architecture may be used with multiple networks in reasonably close proximity. The networking software may include a "group number" of some kind to ensure that a Star node 1 does not join the "wrong" network. In absence of such a group number, a Star node 1 may join whichever network has the best connection. Transactions may be provided whereby a Host 4 tells a Star node 1 to find another network.

Another possibility is that unique IDs may be associated with a device, and a list may be created that allows only devices with known IDs to be added to a network.

Support for Star Nodes in Motion

Star nodes 1 that move frequently, such as Star nodes 1 integrated with handheld computers, may continually need to connect to different Routers 2. The process of continuously joining and re-joining may use system bandwidth and power. Some kind of specialty protocol may be needed for such Star nodes 1, presuming that they are the exception rather than the rule. One approach is for such Star nodes 1 to listen periodically for Beacons from nearby Routers 2 and then direct traffic through nearby Routers v (without actually becoming children of such Routers 2) on an as-needed basis.

Support for Routers in Motion

Our earlier discussion uses examples in which connections between Routers 2 remain relatively stable over time. The system may use an a priori strategy, taking pains to characterize these connections to create an optimal path. For applications where Routers 2 are not in fixed positions, the careful characterization described herein may be an inappropriate use of bandwidth, time, and power. An on-demand approach, such as flooding or Ad Hoc On-Demand Distance Vector (AODV), may create a more appropriate Router 2 backbone under such circumstances.

WSN System Structure

Figure 18:
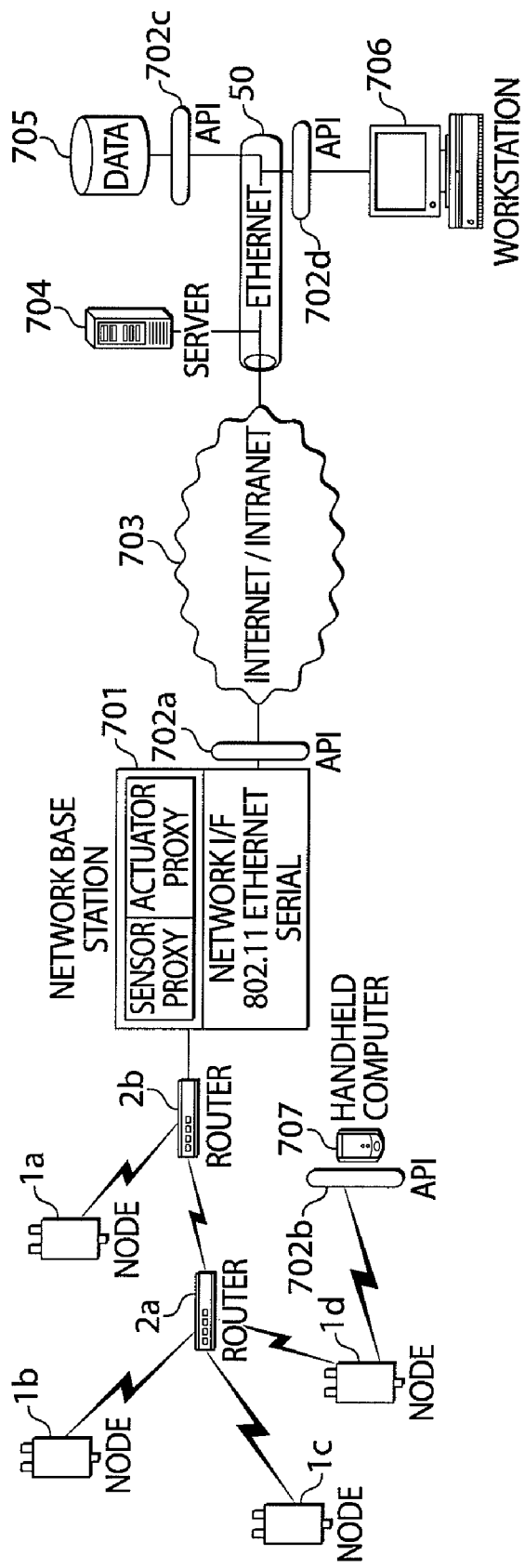
FIG. 18 illustrates one embodiment of a WSN architecture.

FIG. 18 illustrates one embodiment of the WSN architecture.

Nodes (which may be Star nodes or Routers, but which are shown as Star nodes 1 in FIG. 18 for simplicity) may connect to Routers 2 in parent-child relationships. Routers 2 may also become children of other Routers 2. The mesh of Nodes 1 and Routers 2 may connect to a network base station 701, which may incorporate proxy and other functions. From the base station 701, Node 1 and Router 2 data may pass via an API 702*a* through an Internet or Intranet connection 703 to other networked devices. For example, data may pass to an Ethernet-connected workstation 706 via an API 702*d*, to a server 704, and/or to a database 705 via an API 702*c*.

Alternately, Nodes 1 may connect to a handheld computer 707 via an API 702*b*. If the handheld computer 707 has a network connection, then from the handheld computer 707, data may pass to networked devices as described above.

Figure 19:
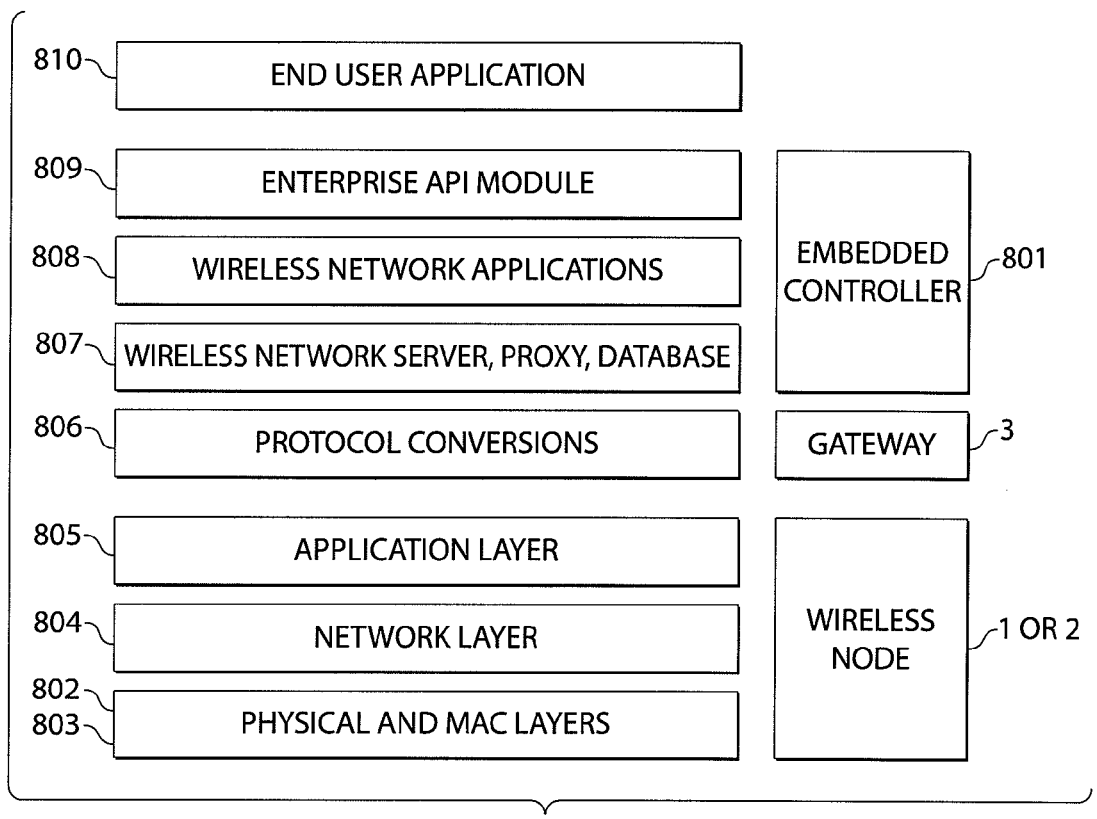
FIG. 19 shows an overview of some elements that may be present in a WSN.

FIG. 19 illustrates one way to structure a WSN 100. PHY 802, MAC 803, NET 804, and APP 805 layers may be present in each wireless node (Star node 1 or Router 2).

A Gateway 3 may perform protocol conversions. For example, a WSN 100 may include multiple types of wireless nodes from several different manufacturers. As it passes through the Gateway 3, the information from each of these node types may be converted to a common protocol 806.

There may be an embedded controller 801 with a wireless network proxy, server, and database 807, wireless network applications 808, and an API module 809. If more than one protocol is used in the WSN 100, then duplicate embedded controllers 801 may be used, one for each protocol. The proxy may be used to process read (e.g., "What is the status of Node A?") and write (e.g., "Turn on the actuator on Node B.") requests. Rather than sending these requests directly from one node to another, network applications 808 may use the proxy to process and forward these requests, as the proxy's database may maintain the current status of all nodes in the network.

There may also be end user applications 810, such as management software and specific user applications (for example, a graphical interface for viewing the status of nodes in the network and data obtained from those nodes).

Figure 20:
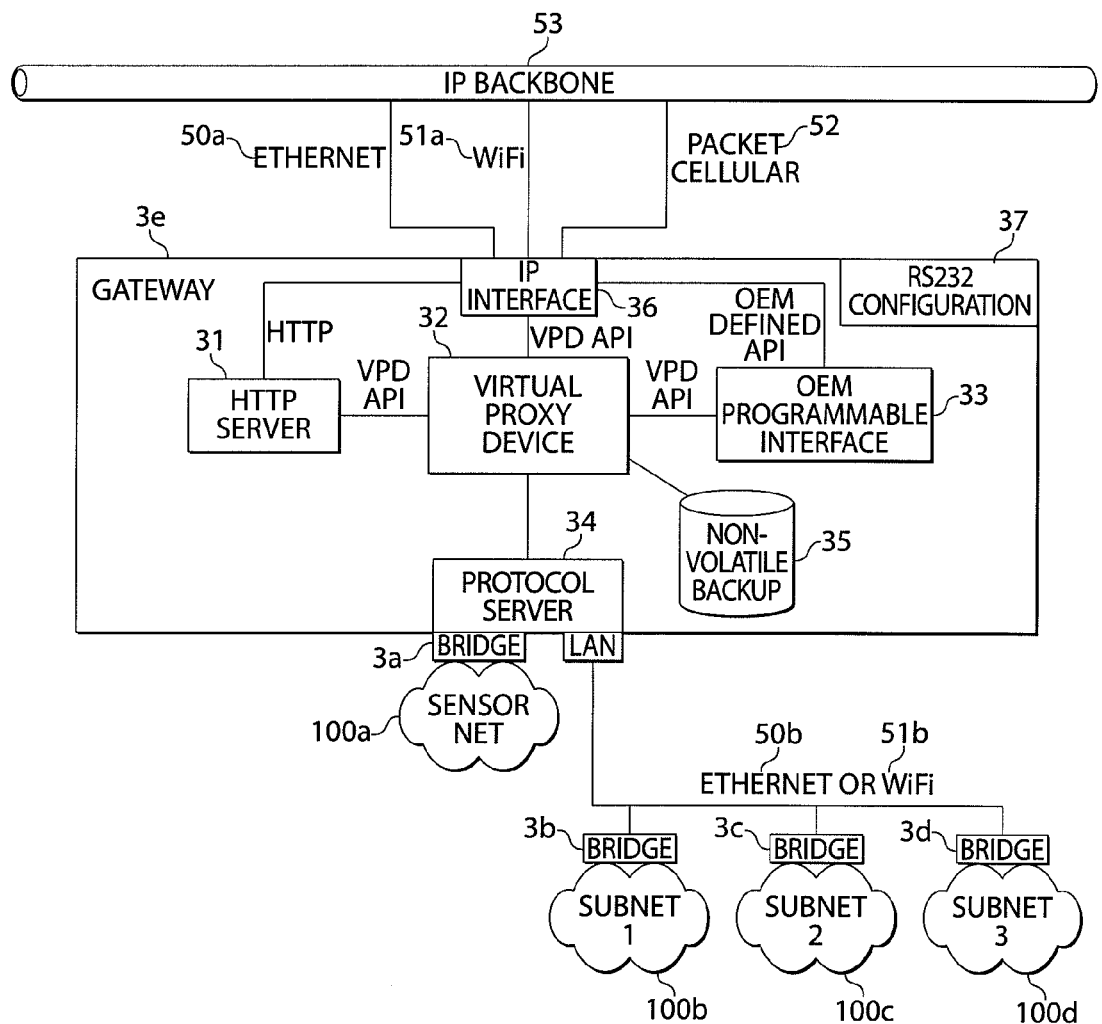
FIG. 20 shows an embodiment of a WSN controller.

FIG. 20 illustrates one embodiment of a WSN controller. Sensor data may be passed to the controller directly from a WSN 100 through a Gateway 3, or multiple WSNs 100 may form subnets on an Ethernet 50 or WiFi 51 LAN. A protocol server 34 or Gateway 3 may translate data from each different type of WSN protocol into a common format. There may be a proxy 32 to handle read and write requests; the proxy 32 may maintain its own database 35.

From the proxy 32, data may pass to an HTTP server 31, which may forward the data to an IP interface 36 in HTTP format; to an OEM programmable interface 33, which may forward the data to an IP interface 36 in some OEM-selected format; or directly to an IP interface 36. The IP interface 36 may transmit the data to an IP network backbone 53 using, for example, Ethernet 50, WiFi 51, or packet cellular 52. There may also be an RS232 interface 37 for transmitting data through a serial connection, particularly for configuration of the Gateway 3 device.

Figure 21:
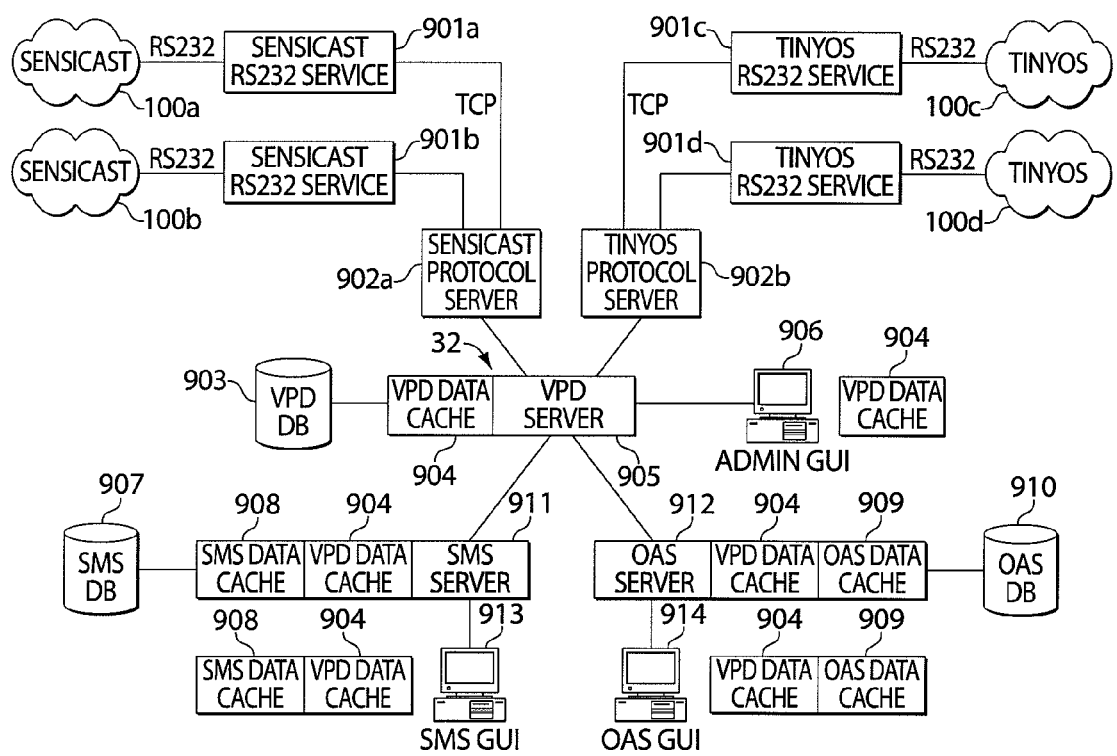
FIG. 21 shows an embodiment of a proxy.

FIG. 21 illustrates one embodiment of a proxy 32 (VPD, or Virtual Proxy Device). In the example in FIG. 21, there are four subnetworks: two Sensicast WSNs 100*a* and 100*b* and two TinyOS networks 100*c* and 100*d*. Data from each network may pass through a Gateway 3 that may be connected to a Host 4 via an RS232 connection. Data from each WSN 100 may pass through an RS232 Service 901 via TCP to a Protocol Server 902 for protocol translation into a format that is common across different types of WSNs 100. From the protocol servers, data may pass to the Virtual Proxy Device (VPD) 32. The VPD 32 provides an abstraction of the network for application programs, whereby each WSN sensor or actuator is represented as a software object. The VPD 32 handles the details of keeping the virtual devices on the Host 4 consistent with the physical devices on the network.

Within the VPD 32, there may be a VPD Server 905 for processing and forwarding requests and data, and a VPD Data Cache 904 for storing information. The VPD 32 may also maintain a database 903. The VPD 32 may be connected to an administrative graphical user interface (GUI) 906 that may be used for network administration; this administrative GUI 906 may maintain its own mirror of the VPD Data Cache 904.

The VPD 32 may also pass information to and from specific application GUIs. In the example in FIG. 21, there is a Sensor Management System (SMS) GUI 913, which may be used for managing the sensors in the WSNs, and an Object Alarm System (OAS) GUI 914, which may be used to monitor alarm conditions related to sensor data (for example, being alerted when sensors on artwork detect unauthorized touching). The VPD Server 905 may pass information to and from a server specific to each GUI (e.g., an SMS Server 911 and an OAS Server 912) that may forward information to and from its own GUI.

Each application-specific server may maintain a mirror of the VPD Data Cache 904, as well as its own application-specific data cache 908/909 and database 907/910. Each application GUI may itself maintain a mirror of the VPD Data Cache 904 and of its own application-specific data cache 908/909.

In this disclosure, we have described network architectures and protocols designed for use in wireless sensor networks (WSNs). We have considered adaptive frequency agile (AFA) and frequency hopping (FH) systems within this context. We have discussed network formation, communication within WSNs, system enhancements, and making changes to existing networks. We have also considered options for security within such networks. Again, the embodiments described herein are meant to be illustrative and are not intended as limiting. Also, various features described above may be combined in any suitable way to form a system in accordance with the invention.

The invention claimed is:

1. A wireless sensor network comprising:
a plurality of star nodes constructed and arranged to transmit and receive wireless signals; and
a plurality of routers each constructed and arranged to transmit and receive wireless signals for communication with at least one star node, and constructed and arranged to transmit and receive wireless signals for communication with at least one other device in the wireless sensor network;
wherein at least one star node or at least one router performs a connectivity assessment for at least first and second other devices in the network that indicates a measure of a quality of wireless communication between the at least one star node or the at least one router and the first and second other devices in the network, the connectivity assessment being performed for each respective one of the first and second other devices at multiple, different frequencies, the connectivity assessment being used to determine a first communication relationship between the at least one star node or at least one router and the first device, and a second communication relationship between the at least one star node or at least one router and the second device, the first and second communication relationships being established for future communication between the at least one star node or at least one router and the first and second devices at multiple frequencies, respectively, such that if a communication with the first device at a first frequency is unsuccessful, the at least one star node or at least one router retries the communication with the second device and at a second frequency.

2. The network of claim 1, wherein the first communication relationship is established between the at least one star node or the at least one router and a first available device with which the at least one star node or at least one router has a highest quality of communication amongst available devices based on the connectivity assessment.

3. The network of claim 2, wherein the second communication relationship is established between the at least one star node or the at least one router and a second available device with which the at least one star node or at least one router has a second highest quality of communication amongst available devices based on the connectivity assessment.

4. The network of claim 1, wherein the at least one star node or at least one router performs the connectivity assessment and reports results of the connectivity assessment based on a wireless signal sent to the at least one star node or at least one router.

5. The network of claim 1, wherein the at least one star node or at least one router changes the first or second relationship based on a command signal.

6. The network of claim 1, wherein at least one star node changes its status from star node to router in the network based on a command signal.

7. The network of claim 1, wherein the connectivity assessment is performed based on one-way communication between the at least one star node or at least one router and the other devices.

8. The network of claim 1, wherein the connectivity assessment is performed based on two-way communication between the at least one star node or at least one router and the other devices.

9. The network of claim 1, wherein the connectivity assessment is performed based on a probabilistic analysis of communication between the at least one star node or at least one router and the other devices.

10. The network of claim 1, wherein the connectivity assessment involves communication link quality metrics.

11. The network of claim 10, wherein the communication link quality metrics include received signal strength and/or correlation quality.

12. The network of claim 1, wherein the connectivity assessment involves use of thresholds for relating communication link quality metrics with reduced connectivity experience.

13. The network of claim 1, wherein the connectivity assessment involves accounting of a proportion of scheduled communication packets that are received and/or acknowledged.

14. The network of claim 13, wherein the communication packets are received and acknowledged by the other devices.

* * * * *